US012739129B2

(12) United States Patent
Armleder

(10) Patent No.: US 12,739,129 B2
(45) Date of Patent: Sep. 15, 2026

(54) DEVICES, SYSTEMS, AND METHODS FOR PERFORMING A DIGITAL SIGNATURE

(71) Applicant: Sebastien Armleder, Carouge (CH)

(72) Inventor: Sebastien Armleder, Carouge (CH)

(73) Assignee: Sebastien Armleder, Carouge (CH)

( * ) Notice: Subject to any disclaimer, the term of this patent is extended or adjusted under 35 U.S.C. 154(b) by 313 days.

(21) Appl. No.: 18/282,169

(22) PCT Filed: Mar. 16, 2022

(86) PCT No.: PCT/EP2022/056892
§ 371 (c)(1),
(2) Date: Sep. 14, 2023

(87) PCT Pub. No.: WO2022/194969
PCT Pub. Date: Sep. 22, 2022

(65) Prior Publication Data

US 2024/0154816 A1 May 9, 2024

(30) Foreign Application Priority Data

Mar. 17, 2021 (EP) .................................... 21163036

(51) Int. Cl.
*H04L 9/32* (2006.01)

(52) U.S. Cl.
CPC .................................. *H04L 9/3247* (2013.01)

(58) Field of Classification Search
None
See application file for complete search history.

(56) References Cited

U.S. PATENT DOCUMENTS 7,415,614 B2 * 8/2008 Guillou ................. H04L 9/3247 380/278
7,543,336 B2 * 6/2009 Lampson ................ G06F 9/468 726/33
9,246,687 B2 * 1/2016 Dellow ................. H04L 9/3247
10,574,459 B2 * 2/2020 Raju ..................... H04L 9/0897
11,233,644 B2 * 1/2022 Kreder, III ............ H04L 9/0897
11,671,246 B2 * 6/2023 Spitz ....................... H04W 4/50 713/189
11,677,547 B1 * 6/2023 McDonald ............ H04L 9/3247 713/171

(Continued)

FOREIGN PATENT DOCUMENTS

WO 2019032659 A1 2/2019

OTHER PUBLICATIONS

International Search Report mailed in application PCT/EP2022/056892, mailed on Nov. 7, 2022.

*Primary Examiner* — Backhean Tiv
(74) *Attorney, Agent, or Firm* — ALG Intellectual Property, LLC

(57) ABSTRACT

A data processing device for performing a digital signature includes a secure portion, wherein the secure portion includes a private data processing device key and/or wherein the secure portion includes a seed configured to generate at least one pair of a private data processing device key and a public data processing device key. The data processing device further includes an authorization protocol. The data processing device is configured to digitally sign a data element with a private data processing device key in the secure portion in response to successful completion of the authorization protocol.

17 Claims, 9 Drawing Sheets

(56) References Cited

U.S. PATENT DOCUMENTS

| | | | | |
|---|---|---|---|---|
| 11,750,391 | B2 * | 9/2023 | Tzur-David | H04L 63/0861 713/155 |
| 11,777,917 | B2 * | 10/2023 | Erickson | H04L 63/12 726/7 |
| 11,791,996 | B2 * | 10/2023 | Armleder | H04L 9/0877 713/189 |
| 12,022,001 | B1 * | 6/2024 | Abboud | G06F 11/366 |
| 12,132,824 | B2 * | 10/2024 | Armleder | G06Q 20/355 |
| 12,231,555 | B2 * | 2/2025 | Medvinsky | H04L 9/3242 |
| 2003/0014632 | A1 * | 1/2003 | Vanstone | G06Q 20/3674 713/170 |
| 2003/0182552 | A1 * | 9/2003 | Tanimoto | H04L 9/3265 713/170 |
| 2007/0081667 | A1 * | 4/2007 | Hwang | H04L 9/3271 380/30 |
| 2011/0247057 | A1 * | 10/2011 | Baentsch | G06F 21/84 726/5 |
| 2013/0119130 | A1 * | 5/2013 | Braams | G06Q 20/38215 235/382 |
| 2014/0337836 | A1 * | 11/2014 | Ismael | H04L 63/145 718/1 |
| 2018/0152296 | A1 * | 5/2018 | Parez | H04L 9/30 |
| 2019/0052461 | A1 * | 2/2019 | Kreder, III | G06F 21/75 |
| 2020/0220735 | A1 * | 7/2020 | Praus | H04L 9/0643 |
| 2023/0074886 | A1 * | 3/2023 | Armleder | G06F 21/64 |
| 2024/0015026 | A1 * | 1/2024 | Armleder | H04L 9/3249 |
| 2024/0154816 | A1 * | 5/2024 | Armleder | H04L 9/3247 |
| 2025/0150284 | A1 * | 5/2025 | Armleder | H04L 9/3247 |

* cited by examiner

DEVICES, SYSTEMS, AND METHODS FOR PERFORMING A DIGITAL SIGNATURE

The present invention relates generally to cryptography and in particular to digital signing. More particularly, the present invention relates to a method for digitally signing a data element, such as a transaction.

Digital signature functionalities may be of particular interest for blockchain technologies. Blockchain technology has seen a spurt of growth in recent years. It has been used in healthcare, public service, financial services, and even video games. Among its most prominent uses have been cryptocurrencies, such as Bitcoin and Ethereum, and non fungible tokens, or NFTs, for proving ownership of various digital assets, such as digital art prints. Cryptocurrencies offer high security, accountability, and anonymity for transactions. Similarly, NFTs allow possession and trade of digital assets with a proof of authenticity linked to them. For example, an artist may put up their digital work for sale, with a proof of it being their original work, using an NFT which they may upload to a blockchain. The NFT may then be traded on the blockchain network with each transaction being recorded in a ledger of the blockchain. Thus, ownership of the "original" digital asset may be verified. Despite their attractive features however, neither has adoption of cryptocurrencies been as widespread as that of paper-based currencies, nor are digital assets as widely traded as physical ones.

One possible reason for this may be that each blockchain technology uses its own language, execution platform, and encryption system. Blockchains typically operate by distributing copies of a ledger to various 'nodes' in a network and any new transaction (for e.g., transferring a defined amount in the Bitcoin network) has to be verified and updated in the copy of the ledger (the Bitcoin ledger in the example cited above) at each node.

The verification process may comprise two steps. In a first step, proposed transactions may typically be signed digitally using an asymmetric encryption protocol, wherein the generator of the transaction uses their private key (accessible only to them) to digitally sign a transaction. For example, with regard to Bitcoin, the private key is Elliptic Curve (curve P256k1) Cryptography based, and provides control (and therefore ownership) to all the bitcoins associated with this private key, as well as allows for digitally signing transactions.

In a second step, the digitally signed transaction may then be verified by a plurality of the nodes using a public key, of the Bitcoin blockchain for example, accessible to everyone. Once a threshold number of nodes (which may depend on the size of the transaction) verifies a particular transaction, it can be included in an immutable block in the blockchain. The above procedure applies not only to transactions of cryptocurrencies but also to transactions related to NFTs.

Some popular asymmetric encryption schemes used are the Rivest-Shamir-Adleman (RSA) scheme designed by Ron Rivest, Adi Shamir and Leonard Adleman and Elliptic Curve Cryptography (ECC) designed by Neal Koblitz and Victor S. Miller independently. Digital signature algorithms are typically based on these asymmetric encryption schemes. A variant of digital signature algorithms based on elliptic curve cryptography is the Elliptic Curve Digital Signature Algorithm (ECDSA).

Each blockchain may use its own algorithm to generate private and public keys, and keys that may be used on one blockchain may not be used on another, depending on the level of security and the execution platform supported by the blockchain. For example, a transaction signed by an Ethereum blockchain private key may only be verified by an Ethereum blockchain public key and thus may not be suitable for verification by a public key of the Bitcoin blockchain.

While the presently known technology for signing transactions (or, more generally, a data element) may be sufficient in some regards, there are certain drawbacks and limitations. In particular, if a user intends to use more than one blockchain based network (e.g., the Ethereum and the Bitcoin network), they are typically required to have access to private keys of both networks, which is far from optimal as regards simplicity and ease of use. Embodiments of the present invention seek to overcome or at least alleviate the shortcomings and disadvantages of the prior art.

In a first aspect, the present invention relates to a data processing device for performing a digital signature, wherein the data processing device comprises a secure portion, wherein the secure portion comprises a private data processing device key and/or wherein the secure portion comprises a seed configured to generate at least one pair of a private data processing device key and a public data processing device key, an authorization protocol, wherein the data processing device is configured to digitally sign a data element with a private data processing device key in the secure portion in response to a successful completion of the authorization protocol. For example, the data processing device keys may correspond to the Bitcoin network in case the data processing device is used to sign a digital transaction from Ethereum to Bitcoin.

In certain embodiments, the private data processing key may never be extracted from the data processing device and the data processing device may be provided with a mechanism to self-destruct in case a limited number of failed attempts are made to tamper with the private data processing device key.

The authorization protocol may be used to restrict access to the digital signing functionality of the data processing device.

The authorization protocol may comprise the data processing device comprising M public keys, wherein M is a natural number, an N of M scheme, wherein N is a natural number not exceeding M. The data processing device may be configured to digitally sign a data element with a private data processing device key in the secure portion in response to receiving at least N versions of the data element, wherein each of the N versions is signed by a distinct private key corresponding to one of the M public keys.

For example, the M public keys may be the public keys of an Ethereum smart contract that may have been signed between M users. Each of those M users may hold their own private keys corresponding to the M public keys provided to the data processing device.

The secure portion of the data processing device may comprise the M public keys.

The secure portion may further comprise the N of M scheme.

M may be greater than 1. N may also be greater than 1. Preferably, N is strictly greater than 1 to allow for greater security. For example, if M is 3, N may be 2. Thus, access to digital signing functionality of the data processing device may only be possible if the owners of 2 private keys corresponding to the 2 public keys intend to sign the data element. This would disallow misuse of the data processing device by, for example, 1 malicious person.

The data processing device may be a card. This may allow it to be carried with ease and be simple to use.

Receiving the data element may also be a requirement for digitally signing the data element. This may also help to improve security. It may further be a necessary input for verification of the digital signatures by N of M private keys described above. Additionally, in some embodiments, it may not be possible to use the versions of the signed data element to retrieve the unsigned data element, and the unsigned data element may be needed to sign on it with the private data processing device key.

The data processing device may be configured to, in response to receiving the at least N versions of the data element, verify the at least N versions of the data element by using at least N of the M public keys, and to digitally sign the data element with the private data processing device key in the secure portion after a successful verification. Thus, a digital signature functionality of the data processing device may only be accessed after confirmation of the identity of N of M owners of the private keys corresponding to the M public keys stored in the data processing device and may add to the security of the data processing device.

The secure portion may comprise the seed, and the data processing device may be configured to receive a key derivation parameter. The secure portion may be further configured to generate a pair of a private data processing device key and a public data processing device key based on the key derivation parameter. This may be particularly advantageous if a backup device is provided for the data processing device. The key derivation parameter may then be used to sign a data element with a particular key using the backup device in case the data processing device is lost or malfunctions.

The data processing device may be configured to send the data element digitally signed with the private data processing device key.

In embodiments, the data processing device may also be configured to send the public data processing device key. For example, when the public data processing device key is used to sign a data element that may correspond to a transaction between two blockchains, e.g., from Ethereum to Bitcoin, the public data processing device key may be used to verify the authenticity of the transaction on the Bitcoin blockchain.

The data processing device may comprise a device identification code, and the successful completion of the authorization protocol may comprise receiving an identification code and comparing the identification code to the device identification code. This may provide for a simpler authorization protocol making it easier to use the data processing device. As may be appreciated, such a protocol may also make the data processing device more liable to misuse in case the device identification code is revealed. Thus, the authorization protocol comprising an N of M scheme as described above may be preferred.

The secure portion may comprise the device identification code and comparing the identification code to the device identification code may be performed in the secure portion.

The secure portion may further comprise the private data processing device key, and the data processing device may comprise a public data processing device key corresponding to the private data processing device key.

The secure portion may comprise the public data processing device key.

The secure portion may comprise the authorization protocol.

For example, embodiments of the present technology (where it should be understood that this relates to the described methods, devices, and systems) may be used for non fungible tokens ("NFT") on a blockchain. An NFT may be used to identify ownership of a specific digital asset, generally via a digest (hash) of this specific asset that is recorded on the table of a smart contract on a blockchain, jointly with the owner's public key (or a blockchain account with a public key). Thus, a digital "original" is created and only the owner of the public key can assign/move the ownership of the digest to another account or public key. It will thus be understood that NFT is the basis for collectibles on blockchain.

In embodiments of the present technology, as described, an identification code (e.g., a personal identification number, PIN) may be used to authorize a functionality of a data processing device, e.g., a card. On the data processing device, and more particularly in the secure portion of the data processing device, e.g., a pair of a public and private key is generated.

That is, in such embodiments, the private key is "on the chip & hidden forever".

This may also be combined with the creation of a backup device, e.g., by means of a Diffie Hellman protocol, wherein the backup device generally corresponds to the data processing device. Thus, one can achieve provable uniqueness of a pair of card (one for backup).

Afterward, a digital asset can be transferred to the extractable public key (or the account linked to it) of the cards for ownership. Thus, the holder of both devices (i.e., the data processing device and the backup deice) owns the asset. It will be understood that the code inside the data processing device (e.g., card) and its authenticity may be verified by a factory certificate.

The data processing device may be further configured to, when digitally signing the data element, register this digital signing.

The data processing device may be configured to register this digital signing in the secure portion.

The data processing device may be configured to change a counter when digitally signing the data element. The counter may be in the secure portion.

The data processing device described above may further comprise a log file configured to register the digital signing. The secure portion may comprise the log file. The log file may register the digital signing along with the counter number. The log file may be useful for verification purposes, for example to prevent misuse. In such a case, it may be useful to have a log of transactions that have been already been made using the data processing device. Alternatively, it may be advantageous to have the data processing device insured. In this case, it may have to be proved that the data processing device has not been used until the time of insurance, for which purpose the log file may also be used.

In other words, the data processing device (e.g., the secure element) may have a tamper proof log file with a list of signed transactions, along with their corresponding counter number for further verification. Thus, e.g., it can be proven that the data device has not been used before.

The data processing device may comprise a true random number generator, and the true random number generator may be used to generate the private data processing device key and/or the seed in the data processing device. The true random number generator may comprise a random process inherent to the data processing device, for example, a quantum mechanical process, such as shot noise in electronic circuits, that may be amplified and sampled at various intervals to determine a sequence of bits (based on the noise crossing a threshold, for example) from which a seed may be generated. It may further comprise any of thermal noise, avalanche noise, atmospheric noise, vacuum energy fluctuations, or any other sources of random noise.

Alternatively, random input may further be provided to the data processing device that may be used together with the inherent random process, such as thermal fluctuations, present in the data processing device to generate the private data processing device key and/or the seed. By using a source of randomness inherent to the data processing device the uniqueness of the generated seed may be ensured.

Such an implementation may be used to provide a proof of uniqueness. In other words, the seed and/or the private data processing device key (which may also be referred to as the unique key) may generated inside the chip. If the chip has such a "true randomness" functionality, it can be demonstrated together with a code review that the key and/or the seed generated inside the chip is unique and was never extracted. In addition, entropy(randomness) can be injected inside the chip via random characters, to add to the internal randomness generation of the secure micro controller at the moment of seed generation.

Thus one can generate a unique key that you can prove nobody has ever seen. Furthermore, a backup of this key may be generated, e.g., by using a Diffie Hellman secret exchange, and a shared secret before, e.g., to prevent a man in the middle attack.

The data processing device may be configured to provide data stored in the secure portion by means of a cryptographic information exchange protocol only a limited number of times, wherein the limited number is preferably 1. The cryptographic information exchange protocol may be a Diffie-Hellmann information exchange protocol, further preferably an Elliptic Curve Diffie-Hellman information exchange protocol.

That is, the data processing device (i.e., the "original" device) may be designed by code on the secure element to only perform a backup once. Thus, it can be ensured that only one copy or "clone" of the data processing device may be generated.

The counter may be signature type specific.

The counter being signature type specific means that the data processing device may perform a first type of signatures that lead to the counter being increased, and a second type of signatures that do not lead to an increase of the counter. For example, the differentiation between the types of signatures may be the lengths of the data elements to be signed. More particularly, e.g., signing a data element exceeding a certain size (e.g., 40 byte) may lead to an increase of the counter, while signing a data element not exceeding this size may not lead to an increase of the counter.

Such a signature type specific counter may be beneficial, e.g., due to the following. Certain functionalities (e.g., signing a transaction for a certain blockchain) may require certain data elements to be signed. For example, a blockchain may require data elements with a size of 42 bytes to be signed. The counter being signature type specific may in particular allow such signatures to be counted, while other signatures, e.g., signing a data element having only 10 bytes, will not be counted. Thus, when the counter is equal 0, this indicates that the data processing device was not used to sign a data element applicable to the blockchain. At the same time, a signature type specific counter still allows to test the functionality of the data processing device for signing by means of test data elements that will not lead to an increase in the counter. Thus, the signing functionality of the data processing device can be tested, while the counter remains at 0, to thereby still indicate that the data processing device was not used to sign a transaction for the blockchain.

The data processing device may comprise a factory certificate.

The data processing device may comprise a clone indicator, wherein the clone indicator indicates whether another data processing device with corresponding functionality was generated. This provides an additional security features, as one may determine whether a child or parent data processing device exists with corresponding functionality.

The secure portion may comprise the clone indicator.

In a second aspect, the present invention relates to a system comprising the data processing device as discussed before and a backup device comprising a backup secure portion, wherein the backup secure portion comprises the private data processing device key and/or the seed, the authorization protocol, and wherein the backup device is configured to digitally sign a data element with a private data processing device key in the backup secure portion in response to successful completion of the authorization protocol. A backup device may be helpful in case the data processing device gets lost or damaged.

The data processing device of the system as described above may comprise M public keys, and the N of M scheme, wherein the backup device may be configured to digitally sign a data element with the private data processing device key in the backup secure portion in response to receiving at least N versions of the data element, wherein each of the N versions is signed by a distinct private key corresponding to one of the M public keys.

The private data processing device key and/or the seed and the authorization protocol may be provided to the backup secure portion by a cryptographic information exchange protocol, preferably by a Diffie-Hellmann information exchange protocol, further preferably by an Elliptic Curve Diffie-Hellman information exchange protocol. The information exchange protocol may be used to generate a shared private key prior to the exchange of information. For example, the data processing device and the backup device may each comprise the shared private key, and information may be exchanged after symmetric encryption such that the shared private key may be used to both encrypt the data before sending it from the secure portion of the data processing device and decrypt the data after receiving it in the secure portion of the backup device. This may help to secure the information exchange against any men in the middle attacks.

The backup device may further comprise any of the features of the data processing device described above.

In particular, the data processing device may comprise a device identification code as described above and the backup secure portion may also comprise the device identification code.

The backup secure portion may also comprise the authorization protocol.

The backup device may be configured not to provide data stored in the backup secure portion by means of a cryptographic information exchange protocol. In other words, the backup device may have its "copying" or "cloning" functionality disabled.

In particular in combination with a data processing device that only allows data in its secure portion to be provided once, this may guarantee that the combination of the data processing device and the backup device is unique and no further copies can be generated.

In a third aspect, the present invention relates to a method of initializing a data processing device, wherein the method comprises providing the data processing device, wherein the data processing device comprises a secure portion, wherein the secure portion comprises a private data processing device key and/or wherein the secure portion comprises a seed configured to generate at least one pair of a private data processing device key and a public data processing device key, providing an authorization protocol to the data processing device, configuring the data processing device to digitally sign a data element with a private data processing device key in the secure portion in response to a successful completion of the authorization protocol.

The method may further comprise providing M public keys to the data processing device, wherein M is a natural number, providing an N of M scheme to the data processing device, wherein N is a natural number not exceeding M, configuring the data processing device to digitally sign a data element with a private data processing device key in the secure portion in response to receiving at least N versions of the data element, wherein each of the N versions is signed by a distinct private key corresponding to one of the M public keys.

The data processing device may digitally sign the data element only when it receives the data element as well.

The method may further comprise the data processing device verifying the at least N versions of the data element by using at least N of the M public keys, and digitally signing the data element with the private data processing device key in the secure portion after a successful verification, in response to receiving the at least N versions of the data element.

The secure portion may comprise the seed, and the method may comprise providing a key derivation parameter to the data processing device and the secure portion generating a pair of a private data processing device key and a public data processing device key based on the key derivation parameter.

The method may further comprise sending the data element digitally signed with the private data processing device key.

The method may further comprise sending the public data processing device key.

The method may comprise providing a device identification code to the data processing device, and configuring the data processing device to, in response to receiving an identification code, compare the identification code to the device identification code, and successfully complete the authorization protocol when the identification code matches the device identification code.

The device identification code may be provided to the secure portion, and the data processing device may be configured to perform the comparison in the secure portion.

The authorization protocol may be provided to the secure portion.

The method may further comprise configuring the data processing device to when digitally signing the data element, register this digital signing, preferably in the secure portion.

The method may further comprise configuring the data processing device to change a counter when digitally signing the data element, wherein the counter preferably is in the secure portion.

The method may further comprises registering the digital signing in a log file, wherein the log file preferably is in the secure portion.

The method may further comprise providing a random input to the data processing device.

The method may further comprise the data processing device generating the private data processing device key and/or the seed using the true random number generator.

The method may also comprise configuring the data processing device to provide data stored in the secure portion by means of a cryptographic information exchange protocol only a limited number of times, wherein the limited number is preferably 1.

In a fourth aspect, the present invention relates to a method of generating a backup device, wherein the method comprises providing a data processing device according as discussed before, providing a second data processing device comprising a backup secure portion, and providing the private data processing device key and/or the seed, the authorization protocol to the second data processing device and thereby generating the backup device, and configuring the backup device to digitally sign a data element with a private data processing device key in the secure portion in response to a successful completion of the authorization protocol.

The method may further comprise providing the device identification code to the backup secure portion.

The method may comprise providing the device identification code to the backup secure portion by the cryptographic information exchange protocol.

The method may further comprise configuring the backup device to when digitally signing the data element, register this digital signing, preferably in the backup secure portion.

The method may further comprise configuring the backup device to change a counter when digitally signing the data element, wherein the counter is preferably stored in the backup secure portion.

The method may further comprise configuring the backup device to register a digital signing in a log file, wherein the log file is preferably stored in the backup secure portion.

The method may also comprise configuring the backup device not to provide data stored in the backup secure portion by means of a cryptographic information exchange protocol.

In a fifth aspect, the present invention relates to a method, wherein the method uses the data processing device as discussed before, wherein the method comprises successfully completing the authorization protocol, in response thereto, the data processing device digitally signing the data element with a private data processing device key in the backup secure portion.

The method may comprise signing at least each of N versions of a data element with a distinct private key corresponding to one of the M public keys, the data processing unit receiving the at least N signed versions of the data element, and in response thereto, the data processing unit digitally signing the data element with a private data processing device key in the secure portion.

In a sixth aspect, the present invention relates to a method, wherein the method uses the system discussed before, wherein the method comprises successfully completing the authorization protocol on the backup device, in response thereto, the backup device digitally signing the data element with a private data processing device key in the backup secure portion.

The method may further comprise signing at least each of N versions of a data element with a distinct private key corresponding to one of the M public keys, the backup device receiving the at least N signed versions of the data element, and in response thereto, the backup device digitally signing the data element with a private data processing device key in the backup secure portion.

The method may further comprise the backup device verifying the at least N versions of the data element by using at least N of the M public keys, and digitally signing the data element with the private data processing device key in the backup secure portion after a successful verification, in response to receiving the at least N versions of the data element.

The backup secure portion may comprise the seed, and the method may further comprise providing a key derivation parameter to the backup device and the backup secure portion generating a pair of a private data processing device key and a public data processing device key based on the key derivation parameter.

The method may further comprise sending the data element digitally signed with the private data processing device key.

The method may further comprise sending the public data processing device key.

In a seventh aspect, the present invention relates to a method for testing a prior use of a data processing device described above or a prior use of a system described above. The method comprises the data processing device outputting data of the counter and/or outputting data of the log file, and verifying whether there was a prior use of the data processing device by means of the data of the counter and/or the data of the log file.

This may be beneficial, e.g., in the following situation. The public data processing device key may be linked to a digital asset, e.g., an NFT or a unit of a cryptocurrency. It will thus be understood that the data processing device with its private data processing device key can be used to transfer the respective digital asset. However, by means of the counter or the log file, it may be determined whether such a transaction occurred. E.g., in case the counter equals zero and/or the log file does not have an entry indicating a transaction, this indicates that the data processing device was not used for a transaction, and (provided that no other data processing device was used for that) that the digital asset is still linked to the public data processing device key.

The method may further comprise the data processing device outputting the factory certificate; and checking an authenticity of the factory certificate. This may add a further level of authenticity.

The method may further comprise the data processing device outputting data of the clone indicator; and assessing by means of the data of the clone indicator whether another data processing device with corresponding functionality was generated. It will be understood that this further adds to the security of the described method. By means of the clone indicator, it can be determined whether the data processing device is a single data processing device or whether there exists another data processing device (e.g., a backup data processing device) with corresponding functionality. If the data processing device is a single data processing device, it may be sufficient to check the single data processing device to be certain that a digital asset linked to the public data processing device key has not been transferred. However, if there is another data processing device with corresponding functionality, one may also wish to check for the other data processing device that it was not used to sign a transaction.

The method may further comprise the data processing device outputting the public data processing device key.

The method may further comprise verifying whether a digital asset belongs to the public data processing device key.

The method may further comprise the data processing device receiving a test data element, the data processing device signing the test data element with the data processing device private key and thus generating a signed test data element, and the data processing device outputting the signed test data element. Thus, it may be tested whether the private data processing device key is functional.

The data processing device signing the test data element may not lead to a change of the counter. Thus, it may be possible to test the functionality of the private data processing device key while the counter still indicates, e.g., that the data processing device was not used to transfer a digital asset.

Assessing whether another data processing device with corresponding functionality was generated may yield a positive result, and the method may further comprise the backup data processing device outputting data of its counter and/or outputting data of its log file, and verifying whether there was a prior use of the backup data processing device by means of the data of its counter and/or the data of its log file.

The method may further comprise the backup data processing device outputting its factory certificate; and checking an authenticity of the factory certificate of the backup data processing device.

The method may further comprise the backup data processing device outputting data of its clone indicator; and assessing by means of the data of the clone indicator of the backup data processing device whether another data processing device with corresponding functionality was generated.

The method may further comprise the backup data processing device outputting the public data processing device key.

The method may further comprise verifying whether the public data processing device key output by the data processing device is identical to the public data processing device key output by the backup data processing device.

The method may further comprise the backup data processing device receiving a testing data element, the backup data processing device signing the testing data element with the data processing device private key and thus generating a signed testing data element, and the backup data processing device outputting the signed testing data element.

The backup data processing device signing the testing data element may not lead to a change of the counter of the backup device.

That is, for the test of the backup data processing device, considerations corresponding to the one discussed for the data processing device may apply.

Below, device embodiments will be discussed. These embodiments are abbreviated by the letter "D" followed by a number. Whenever reference is herein made to device embodiments, these embodiments are meant.

D1. A data processing device for performing a digital signature, wherein the data processing device comprises

- a secure portion, wherein the secure portion comprises a private data processing device key and/or wherein the secure portion comprises a seed configured to generate at least one pair of a private data processing device key and a public data processing device key,
- an authorization protocol,
- wherein the data processing device is configured to
- digitally sign a data element with a private data processing device key in the secure portion in response to a successful completion of the authorization protocol.

D2. The data processing device according to the preceding embodiment, wherein the data processing device comprises

- M public keys, wherein M is a natural number,
- an N of M scheme, wherein N is a natural number not exceeding M, wherein the successful completion of the authorization protocol comprises receiving at least N versions of the data element, wherein each of the N versions is signed by a distinct private key corresponding to one of the M public keys.

D3. The data processing device according to the preceding embodiment, wherein the secure portion comprises the M public keys.

D4. The data processing device according to any of the 2 preceding embodiments, wherein the secure portion comprises the N of M scheme.

D5. The data processing device according to any of the 3 preceding embodiments, wherein M is greater than 1.

D6. The data processing device according to the preceding embodiment, wherein N is greater than 1.

D7. The data processing device according to any of the preceding embodiments, wherein the data processing device is a card.

D8. The data processing device according to any of the preceding embodiments, wherein receiving the data element is also a requirement for digitally signing the data element.

D9. The data processing device according to any of the preceding embodiments with the features of embodiment D2, wherein the data processing device is configured to in response to receiving the at least N versions of the data element, verify the at least N versions of the data element by using at least N of the M public keys, and to digitally sign the data element with the private data processing device key in the secure portion after a successful verification.

D10. The data processing device according to any of the preceding embodiments, wherein the secure portion comprises the seed, and wherein the data processing device is configured to receive a key derivation parameter and wherein the secure portion is configured to generate a pair of a private data processing device key and a public data processing device key based on the key derivation parameter.

D11. The data processing device according to any of the preceding embodiments, wherein the data processing device is configured to send the data element digitally signed with the private data processing device key.

D12. The data processing device according to any of the preceding embodiments with the features of embodiment D10, wherein the data processing device is configured to send the public data processing device key.

D13. The data processing device according to any of the preceding embodiments, wherein the data processing device comprises a device identification code, and wherein the successful completion of the authorization protocol comprises receiving an identification code and comparing the identification code to the device identification code.

D14. The data processing device according to the preceding embodiment, wherein the secure portion comprises the device identification code and wherein comparing the identification code to the device identification code is performed in the secure portion.

D15. The data processing device according to any of the preceding embodiments, wherein the secure portion comprises the private data processing device key, and wherein the data processing device comprises a public data processing device key corresponding to the private data processing device key.

D16. The data processing device according to the preceding embodiment, wherein the secure portion comprises the public data processing device key.

D17. The data processing device according to any of the preceding embodiments, wherein the secure portion comprises the authorization protocol.

D18. The data processing device according to any of the preceding embodiments, wherein the data processing device is further configured to, when digitally signing the data element, register this digital signing.

D19. The data processing device according to the preceding embodiment, wherein the data processing device is configured to register this digital signing in the secure portion.

D20. The data processing device according to any of the preceding embodiments, wherein the data processing device is configured to change a counter when digitally signing the data element.

D21. The data processing device according to the preceding embodiment, wherein the counter is in the secure portion.

D22. The data processing device according to any of the preceding embodiments and with the features of embodiment D18, wherein the data processing device comprises a log file configured to register the digital signing.

D23. The data processing device according to the preceding embodiment, wherein the secure portion comprises the log file.

D24. The data processing device according to any of the 2 preceding embodiments and with the features of embodiment D20, wherein the log file registers the digital signing along with the counter number.

D25. The data processing device according to any of the preceding embodiments, wherein the data processing device comprises a true random number generator, and wherein the true random number generator is used to generate the private data processing device key and/or the seed in the data processing device.

D26. The data processing device according to the preceding embodiment, wherein the true random number generator is further provided with random input generated outside the data processing device to generate the private data processing device key and/or the seed.

D27. The data processing device according to any of the preceding embodiments, wherein the data processing device is configured to provide data stored in the secure portion by means of a cryptographic information exchange protocol only a limited number of times, wherein the limited number is preferably 1.

D28. The data processing device according to any of the preceding embodiments with the features of embodiment D20, wherein the counter is signature type specific.

The counter being signature type specific means that the data processing device may perform a first type of signatures that lead to the counter being increased, and a second type of signatures that do not lead to an increase of the counter. For example, the differentiation between the types of signatures may be the lengths of the data elements to be signed. More particularly, e.g., signing a data element exceeding a certain size (e.g., 40 byte) may lead to an increase of the counter, while signing a data element not exceeding this size may not lead to an increase of the counter.

D29. The data processing device according to any of the preceding embodiments, wherein the data processing device comprises a factory certificate.

D30. The data processing device according to any of the preceding embodiments, wherein the data processing device comprises a clone indicator, wherein the clone indicator indicates whether another data processing device with corresponding functionality was generated.

D31. The data processing device according to the preceding embodiment, wherein the secure portion comprises the clone indicator.

Below, system embodiments will be discussed. These embodiments are abbreviated by the letter "S" followed by a number. Whenever reference is herein made to system embodiments, these embodiments are meant.

S1. A system comprising the data processing device according to any of the preceding device embodiments and a backup device comprising a backup secure portion, wherein the backup secure portion comprises

- the private data processing device key and/or the seed,
- the authorization protocol,
- wherein the backup device is configured to
- digitally sign a data element with a private data processing device key in the backup secure portion in response to a successful completion of the authorization protocol.

S2. The system according to the preceding embodiment, wherein the data processing device is according to any of the preceding device embodiments with the features of embodiments D2, D3, and D4,

- wherein the backup secure portion comprises
  - the M public keys, and
  - the N of M scheme,
- and wherein the successful completion of the authorization protocol comprises
  - receiving at least N versions of the data element, wherein each of the N versions is signed by a distinct private key corresponding to one of the M public keys.

S3. The system according to any of the preceding system embodiments, wherein the private data processing device key and/or the seed, and the authorization protocol are provided to the backup secure portion by a cryptographic information exchange protocol, preferably by a Diffie-Hellmann information exchange protocol, further preferably by an Elliptic Curve Diffie-Hellman information exchange protocol.

S4. The system according to the preceding embodiment and with the features of embodiment S2, wherein the M public keys, and the N of M scheme are provided to the backup secure portion by the cryptographic information exchange protocol.

S5. The system according to any of the preceding embodiments, wherein the data processing device is according to any of the preceding device embodiments with the features of embodiment D14, wherein the backup secure portion comprises the device identification code.

S6. The system according to the preceding embodiment and with the features of embodiment S3, wherein the device identification code is provided to the backup secure portion by the cryptographic information exchange protocol.

S7. The system according to any of the preceding system embodiments, wherein the data processing device is according to embodiment D17, wherein the backup secure portion comprises the authorization protocol.

S8. The system according to the preceding embodiment and with the features of embodiment S3, wherein the authorization protocol is provided to the backup secure portion by the cryptographic information exchange protocol.

S9. The system according to any of the preceding system embodiments, wherein the backup device comprises the features described according to any of the preceding device embodiments.

S10. The system according to any of the preceding embodiments, wherein the backup device is configured not to provide data stored in the backup secure portion by means of a cryptographic information exchange protocol.

Below, method embodiments will be discussed. These embodiments are abbreviated by the letter "M" followed by a number. Whenever reference is herein made to method embodiments, these embodiments are meant.

M1. A method of initializing a data process device, wherein the method comprises

- providing the data processing device, wherein the data processing device comprises a secure portion, wherein the secure portion comprises a private data processing device key and/or wherein the secure portion comprises a seed configured to generate at least one pair of a private data processing device key and a public data processing device key,
- providing an authorization protocol to the data processing device,
- configuring the data processing device to
  - digitally sign a data element with a private data processing device key in the secure portion in response to a successful completion of the authorization protocol.

M2. The method according to the preceding embodiment, wherein the method comprises

- providing M public keys to the data processing device, wherein M is a natural number,
- providing an N of M scheme to the data processing device, wherein N is a natural number not exceeding M,
- wherein the successful completion of the authorization protocol comprises
  - receiving at least N versions of the data element, wherein each of the N versions is signed by a distinct private key corresponding to one of the M public keys.

M3. The method according to the preceding embodiment, wherein the M public keys are provided to the secure portion.

M4. The method according to any of the preceding method embodiments with the features of embodiment M2, wherein the N of M scheme is provided to the secure portion.

M5. The method according to any of the preceding method embodiments with the features of embodiment M2, wherein M is greater than 1.

M6. The method according to any of the preceding method embodiments with the features of embodiment M2, wherein N is greater than 1.

M7. The method according to any of the preceding method embodiments, wherein the data processing device is a card.

M8. The method according to any of the preceding method embodiments, wherein the method further comprises the data processing device digitally signing the data element only when it receives the data element as well.

M9. The method according to any of the preceding method embodiments with the features of embodiment M2, wherein the method comprises the data processing device verifying the at least N versions of the data element by using at least N of the M public keys, and digitally signing the data element with the private data processing device key in the secure portion after a successful verification, in response to receiving the at least N versions of the data element.

M10. The method according to any of the preceding method embodiments, wherein the secure portion comprises the seed, and wherein the method comprises providing a key derivation parameter to the data processing device and wherein the secure portion generates a pair of a private data processing device key and a public data processing device key based on the key derivation parameter.

M11. The method according to any of the preceding method embodiments, wherein the method further comprises sending the data element digitally signed with the private data processing device key.

M12. The method according to the penultimate embodiment, wherein the method further comprises sending the public data processing device key.

M13. The method according to any of the preceding method embodiments, wherein the method comprises providing a device identification code to the data processing device, and configuring the data processing device to, in response to receiving an identification code, compare the identification code to the device identification code, and successfully complete the authorization protocol when the identification code matches the device identification code.

M14. The method according to the preceding embodiment, wherein the device identification code is provided to the secure portion, and wherein the data processing device is configured to perform the comparison in the secure portion.

M15. The method according to any of the preceding method embodiments, wherein the authorization protocol is provided to the secure portion.

M16. The method according to any of the preceding method embodiments, wherein the method further comprises configuring the data processing device to when digitally signing the data element, register this digital signing, preferably in the secure portion.

M17. The method according to any of the preceding method embodiments, wherein the method further comprises configuring the data processing device to change a counter when digitally signing the data element, wherein the counter preferably is in the secure portion.

M18. The method according to any of the preceding method embodiments and with the features of embodiment M16, wherein the method further comprises registering the digital signing in a log file, wherein the log file preferably is in the secure portion.

M19. The method according to any of the preceding method embodiments, wherein the method further comprises providing a random input to the data processing device.

M20. The method according to any of the preceding method embodiments, wherein the data processing device has the features of embodiment D25, and wherein the method further comprises the data processing device generating the private data processing device key and/or the seed using the true random number generator.

M21. The method according to any of the preceding method embodiments, wherein the method comprises configuring the data processing device to provide data stored in the secure portion by means of a cryptographic information exchange protocol only a limited number of times, wherein the limited number is preferably 1.

N1. A method of generating a backup device, wherein the method comprises providing a data processing device according to any of the preceding device embodiments, providing a second data processing device comprising a backup secure portion, and providing the private data processing device key and/or the seed, the authorization protocol, to the second data processing device and thereby generating the backup device, and configuring the backup device to digitally sign a data element with a private data processing device key in the backup secure portion in response to a successful completion of the authorization protocol.

N2. The method according to the preceding embodiment, wherein the private data processing device key and/or the seed are provided to the backup secure portion by a cryptographic information exchange protocol, preferably by a Diffie-Hellmann information exchange protocol, further preferably by an Elliptic Curve Diffie-Hellman information exchange protocol.

N3. The method according to any of the 2 preceding embodiments, wherein the provided data processing device is according to any of the preceding device embodiments with the features of embodiments D2, D3, and D4, wherein the method further comprises providing the M public keys, and the N of M scheme to the second data processing device, and configuring the backup data device to digitally sign a data element with a private data processing device key in the secure portion in response to receiving at least N versions of the data element, wherein each of the N versions is signed by a distinct private key corresponding to one of the M public keys.

N4. The method according to the preceding embodiment and with the features of embodiment N2, wherein the M public keys, and the N of M scheme are provided to the backup secure portion by the cryptographic information exchange protocol.

N5. The method according to any of the 4 preceding embodiments, wherein the provided data processing device is according to any of the preceding device embodiments with the features of embodiment D17, and wherein the method comprises providing the authorization protocol to the backup secure portion.

N6. The method according to the preceding embodiment and with the features of embodiment N2, wherein the authorization protocol is provided to the backup secure portion by the cryptographic information exchange protocol.

N7. The method according to any of the 6 preceding embodiments, wherein the provided data processing device is according to any of the preceding device embodiments with the features of embodiment D14, and wherein the method comprises providing the device identification code to the backup secure portion.

N8. The method according to the preceding embodiment and with the features of embodiment N2, wherein the device identification code is provided to the backup secure portion by the cryptographic information exchange protocol.

N9. The method according to any of the preceding 8 embodiments, wherein the provided data processing device is according to any of the preceding device embodiments with the features of embodiment D18, wherein the method further comprises configuring the backup device to when digitally signing the data element, register this digital signing, preferably in the backup secure portion.

N10. The method according to any of the preceding 9 embodiments, wherein the provided data processing device is according to any of the preceding device embodiments with the features of embodiment D20, wherein the method further comprises configuring the backup device to change a counter when digitally signing the data element, wherein the counter is preferably stored in the backup secure portion.

N11. The method according to any of the preceding 10 embodiments, wherein the provided data processing device is according to any of the preceding device embodiments with the features of embodiment D23, wherein the method further comprises configuring the backup device to register a digital signing in a log file, wherein the log file is preferably stored in the backup secure portion.

N12. The method according to any of the preceding 11 embodiments, wherein the method further comprises configuring the backup device not to provide data stored in the backup secure portion by means of a cryptographic information exchange protocol.

O1. A method, wherein the method uses the data processing device according to any of the preceding device embodiments, wherein the method comprises successfully completing the authorization protocol, in response thereto, the data processing unit digitally signing the data element with a private data processing device key in the secure portion.

O2. The method according to the preceding embodiment, wherein the method comprises signing at least each of N versions of a data element with a distinct private key corresponding to one of the M public keys, the data processing unit receiving the at least N signed versions of the data element.

O3. A method, wherein the method uses the system according to any of the preceding system embodiments, wherein the method comprises successfully completing the authorization protocol on the backup device, in response thereto, the backup device digitally signing the data element with a private data processing device key in the backup secure portion.

O4. The method according to the preceding embodiment, wherein the method comprises signing at least each of N versions of a data element with a distinct private key corresponding to one of the M public keys, the backup device receiving the at least N signed versions of the data element.

O5. The method according to the preceding embodiment, wherein the method further comprises the backup device verifying the at least N versions of the data element by using at least N of the M public keys, and digitally signing the data element with the private data processing device key in the backup secure portion after a successful verification, in response to receiving the at least N versions of the data element.

O6. The method according to any of the 2 preceding embodiments, wherein the backup secure portion comprises the seed, and wherein the method further comprises providing a key derivation parameter to the backup device and wherein the backup secure portion generates a pair of a private data processing device key and a public data processing device key based on the key derivation parameter.

O7. The method according to any of the 6 preceding method embodiments, wherein the method further comprises sending the data element digitally signed with the private data processing device key.

O8. The method according to any of the 7 preceding embodiments, wherein the method further comprises sending the public data processing device key.

Below, testing method embodiments will be discussed. These embodiments are abbreviated by the letter "T" followed by a number. Whenever reference is herein made to testing method embodiments, these embodiments are meant.

T1. A method for testing a prior use of a data processing device according to any of the preceding device embodiments or a prior use of a system according to any of the preceding system embodiments, wherein the data processing device comprises the features of embodiment D20 and/or the features of embodiment D22, wherein the method comprises the data processing device outputting data of the counter and/or outputting data of the log file, and verifying whether there was a prior use of the data processing device by means of the data of the counter and/or the data of the log file.

T2. The method according to the preceding embodiment, wherein the data processing device comprises the features of embodiment D29, wherein the method further comprises the data processing device outputting the factory certificate; and checking an authenticity of the factory certificate.

T3. The method according to any of the 2 preceding embodiments, wherein the data processing device comprises the features of embodiment D30, wherein the method further comprises the data processing device outputting data of the clone indicator; and assessing by means of the data of the clone indicator whether another data processing device with corresponding functionality was generated.

T4. The method according to any of the 3 preceding embodiments, wherein the method further comprises the data processing device outputting the public data processing device key.

T5. The method according to the preceding embodiment, wherein the method further comprises verifying whether a digital asset belongs to the public data processing device key.

T6. The method according to any of the 5 preceding embodiments, wherein the method further comprises the data processing device receiving a test data element, the data processing device signing the test data element with the data processing device private key and thus generating a signed test data element, and the data processing device outputting the signed test data element.

T7. The method according to the preceding embodiment, wherein the data processing device comprises the features of embodiment D28, wherein the data processing device signing the test data element does not lead to a change of the counter.

T8. The method according to any of the 7 preceding embodiments with the features of embodiment T3, wherein the backup device comprises the features of embodiment D20 and/or the features of embodiment D23, wherein assessing whether another data processing device with corresponding functionality was generated yields a positive result, wherein the method further comprises the backup data processing device outputting data of its counter and/or outputting data of its log file, and verifying whether there was a prior use of the backup data processing device by means of the data of its counter and/or the data of its log file.

It should be understood that when it is herein stated, that the backup device comprises the features of embodiment, e.g., D20, this indicates that the back up device comprises corresponding features. More particularly, D20 indicates that the data processing device is configured to change a counter when digitally signing the data element. The backup device comprising these features thus means that the backup device is configured to change a counter when digitally signing the data element. Corresponding considerations also apply to other embodiments.

T9. The method according to the preceding embodiment, wherein the backup data processing device comprises the features of embodiment D29, wherein the method further comprises the backup data processing device outputting its factory certificate; and checking an authenticity of the factory certificate of the backup data processing device.

T10. The method according to any of the 2 preceding embodiments, wherein the backup data processing device comprises the features of embodiment D30, wherein the method further comprises the backup data processing device outputting data of its clone indicator; and assessing by means of the data of the clone indicator of the backup data processing device whether another data processing device with corresponding functionality was generated.

T11. The method according to any of the 3 preceding embodiments, wherein the method further comprises the backup data processing device outputting the public data processing device key.

T12. The method according to the preceding embodiment and with the features of embodiment T3, wherein the method further comprises verifying whether the public data processing device key output by the data processing device is identical to the public data processing device key output by the backup data processing device.

T13. The method according to any of the 5 preceding embodiments, wherein the method further comprises the backup data processing device receiving a testing data element, the backup data processing device signing the testing data element with the data processing device private key and thus generating a signed testing data element, and the backup data processing device outputting the signed testing data element.

T14. The method according to the preceding embodiment, wherein the backup data processing device comprises the features of embodiment D28, wherein the backup data processing device signing the testing data element does not lead to a change of the counter of the backup device.

T15. The method according to any of embodiments T1 to T14, wherein the method is a computer implemented method.

Embodiments of the present technology will now be described with reference to the accompanying figures.

Figure 1:
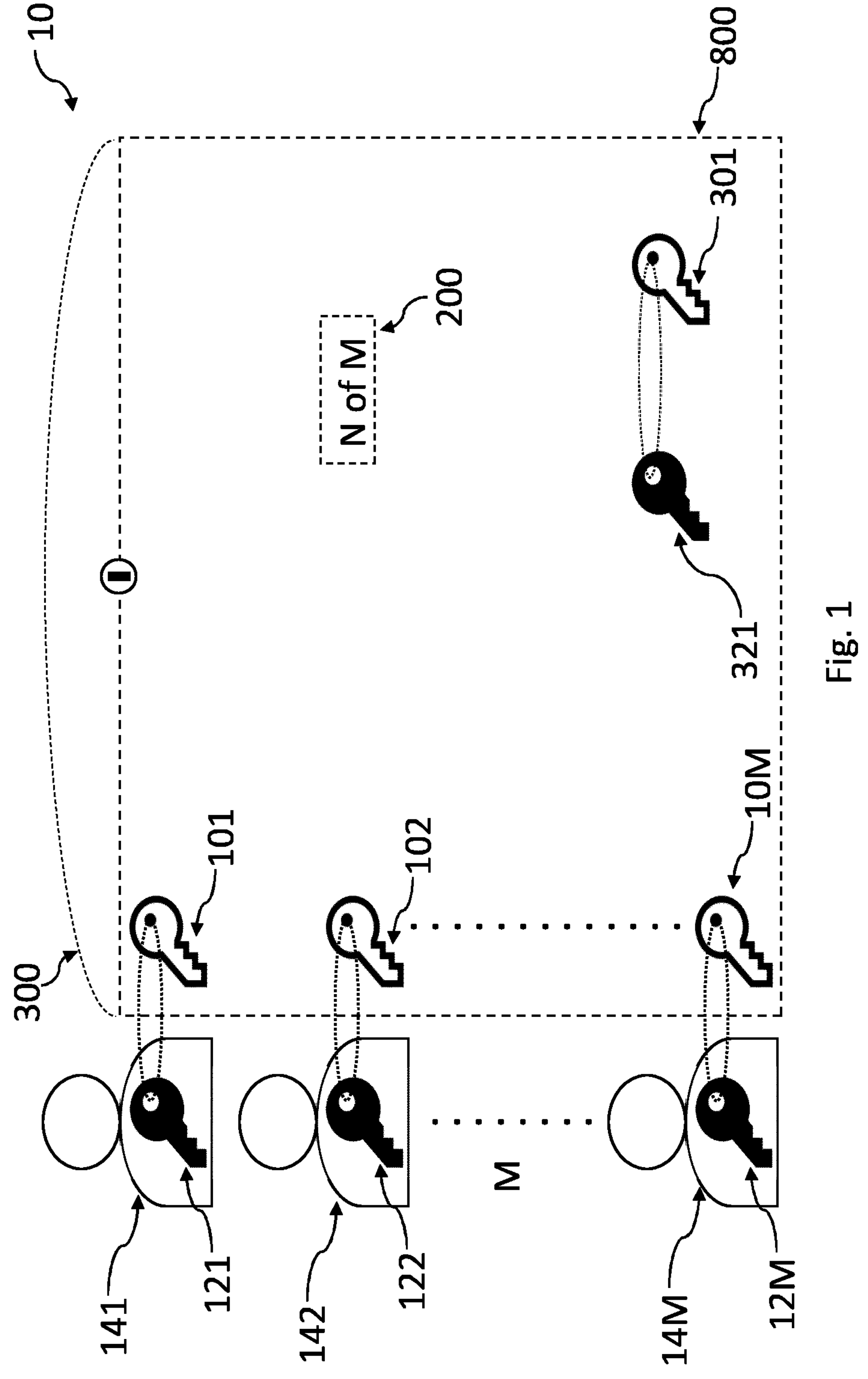
FIG. 1 depicts an initialization of a data processing device with M public keys, an N of M scheme, and a private and public data processing device key.

FIG. 1 depicts one embodiment of a system 10 of the present technology, where there are M pairs of public keys 101, 102, 10M and private keys 121, 122, ( . . . ) 12M. In particular, in embodiment 10, M is 3. Each pair of public and private key may be associated with a user or owner 141, 142, . . . 14M. Thus, in the example depicted in FIG. 1, there are 3 pairs of public keys and private keys.

More particularly, there may be keys 101 and 121 forming a first key pair, keys 102 and 122 forming a second key pair and keys 10M, 12M forming a third key pair. For example, each of these key pairs may be associated with a first functionality, e.g., they may be associated with a smart contract and/or blockchain relating to Ethereum. In the depicted embodiments, a key filled with black color indicates a private key (see, e.g., keys 121, 122, 12M, and 321) and a "white" key indicates a public key (see, e.g., keys 101, 102, 10M, and 301).

Furthermore, in the discussed system 10, a data processing device 800 is provided. For example, the data processing device may be a card. The data processing device comprises a secure portion 300. In the depicted embodiment, all the discussed functionalities are realized in the secure portion 300, which is why the secure portion 300 substantially coincides with the data processing device 800. However, it should be understood that it is also possible that at least some functionalities of the data processing device 800 are realized outside of the secure portion 300.

FIG. 1 depicts a first step, wherein the data processing device 800 may be initialized. The initialization may comprise providing the M public keys 101, 102, ( . . . ) 10M of the described key pairs to the data processing device 800, and providing a number N, wherein N is not greater than M, to the data processing device. This scheme is depicted by the label 200 in FIG. 1. In embodiments, the scheme 200 may be provided in the secure portion 300 of the data processing device 800.

For example, where M is 3, N may be 2. N indicates the number of signatures by the key pairs 101, 121, 102, 122, ( . . . ) 10M, 12M necessary to access functionalities of the data processing device 800. As may be appreciated by a person skilled in the art, N and M are both natural numbers, and N may not exceed M. Furthermore, it may be advantageous to have N greater than 1.

After initialization, the data processing device 800 may be used to perform a signature functionality.

As a mere example, it will be described how the data processing device can be used to perform a signature of a Bitcoin transaction. To sign such a transaction, again a pair of a private key 321 and a public key 301 may be used.

This key pair is present on the data processing device 800. More particularly, the private key 321 and optionally also the public key 301 is present in the secure portion 300 of the data processing device 800. Alternatively, the secure portion 300 may only comprise the private key 321 and no corresponding public key 301 (not shown). The private key 321 may not be extracted from the secure portion 300. The public key 301 may, on the other hand, be extracted from the secure portion 300 once functionalities of the data processing device 800 are enabled.

Figure 2:
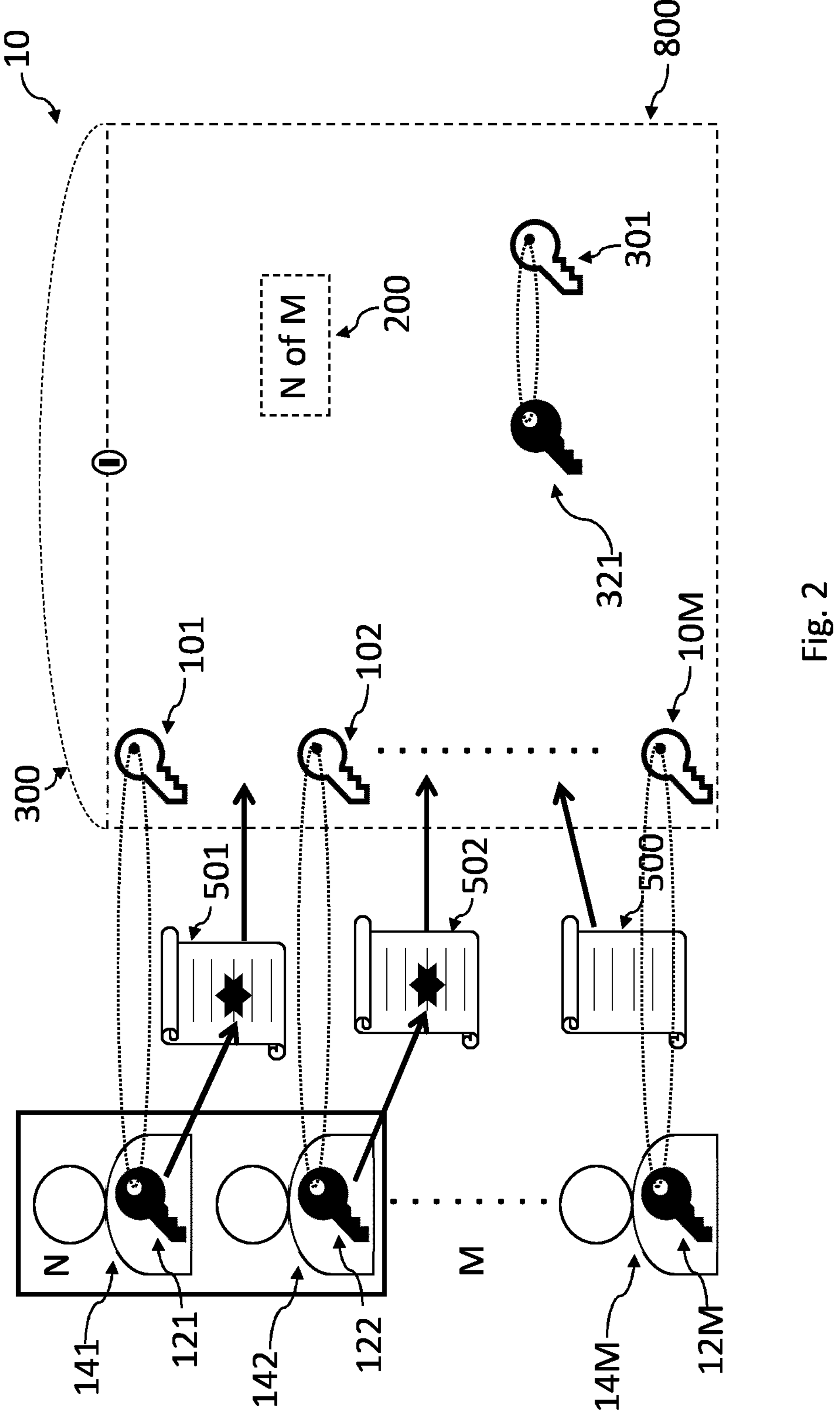
FIG. 2 depicts signing of N versions of a data element using N distinct private keys corresponding to the N public keys.

FIG. 2 depicts a second step of the method, that may comprise digitally signing each of a plurality of versions of the data element 500 with one each of a plurality of the private keys 121, 122, ( . . . ) 12M and providing the plurality of signed versions of the data element 500 to the data processing device 800. Preferably, the plurality of signed versions of the data element 500 may be provided to the secure portion 300 of the data processing device 800. Further preferably, the data element 500 may be a hash relating to a transaction, for example, a Bitcoin transaction. Providing a hash may have the advantage that its length (in terms of bits) is fixed.

As described above, for the embodiment depicted in FIG. 2, functionalities of the data processing device 800 may only be enabled when a defined number N of signatures (in the example: 2) is provided to the data processing device 800. More particularly, to enable functionalities, the data element 500 (e.g., the hash of the Bitcoin transaction) may be provided to the secure portion 300 of the data processing device 800, and at least N versions of the data element 500 digitally signed with different of the private keys 121, 122, ( . . . ) 12M.

For example, the data element 500 (which will be called "data"), a version of the data element signed with key 121 (which is labelled 501) and a version of the data element signed with 122 (which is labeled 502) can be provided to the secure portion 300 of the data processing device 800. This is depicted in FIG. 2, where a subset N of M is chosen which in this case is a subset 2 of 3. The chosen subset of private keys 121, 122, ( . . . ) 12M, which in this case is 121 and 122 are used to digitally sign copies of the data element 500. The signed copies are labelled 501 and 502 in FIG. 2. As described above, the digitally signed data elements 501 and 502 may correspond to one blockchain, for example Ethereum (depicted with a 6-sided star).

Figure 3:
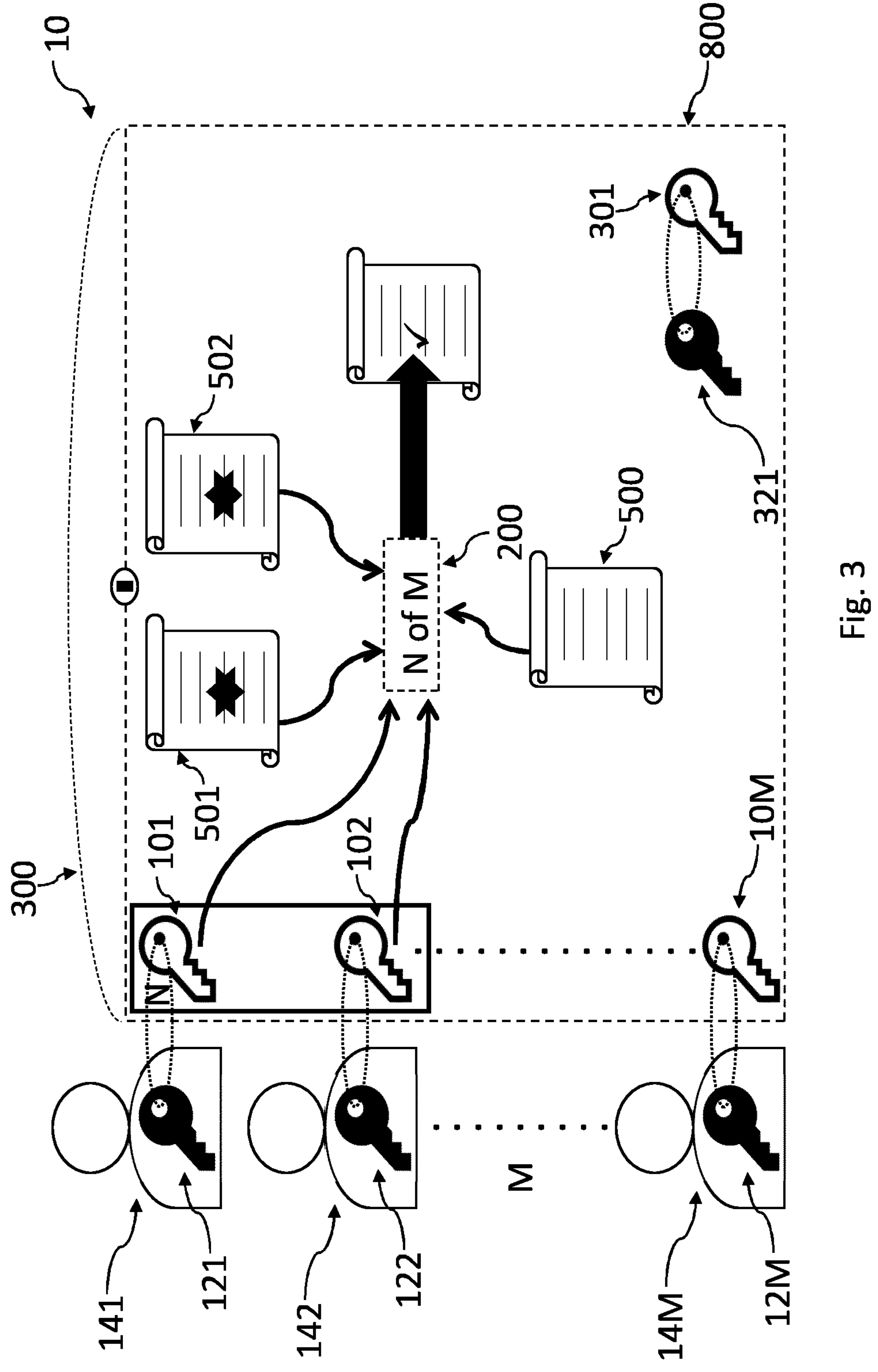
FIG. 3 depicts the data processing device verifying the N signed elements.

FIG. 3 depicts a further step, that may be called a verification step, according to one embodiment of the present technology, wherein the digitally signed elements 501 and 502 are provided to the secure portion 300 of the data processing device 800. The data element 500 may also be provided to the secure portion 300 in this step. In the secure portion 300 of the data processing device 800, the signed versions 501 and 502 can be verified by using the public keys 101 and 102 and the data element 500.

When the correspondingly verified data elements 501, 502 correspond to the data element 500, this is indicative of 2 owners (namely the owners of keys 121 and 122) having agreed to enable the functionalities of the data processing device 800. In line with the N out of M agreement scheme 200 described above, this may trigger functionalities of the data processing device 800 and more particularly of the secure portion 300 of the data processing device 800.

Figure 4:
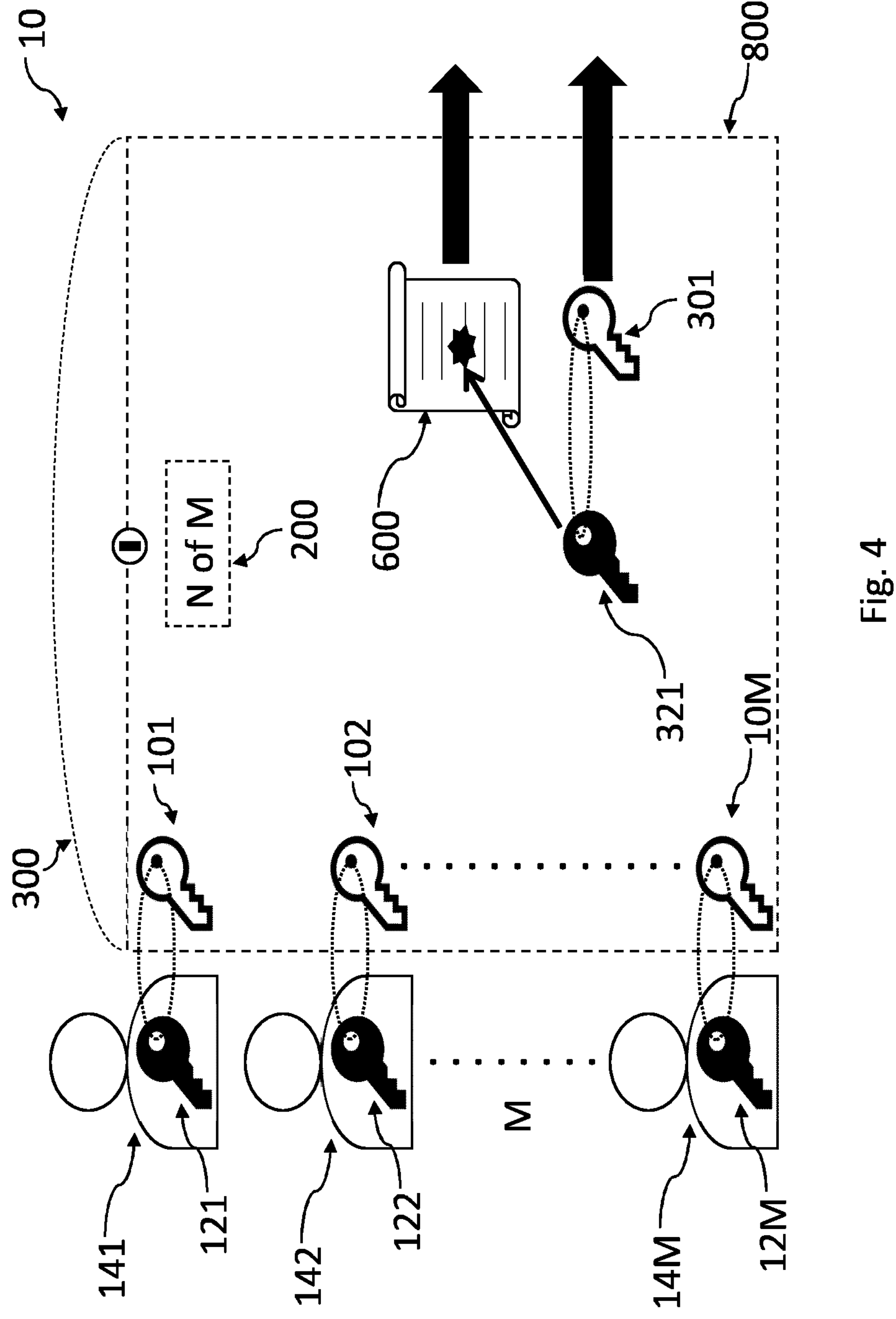
FIG. 4 depicts the data processing device digitally signing the data element using the private data processing device key.

FIG. 4 depicts a further step, that may be called a signing step. Once verification of the signed elements 501, 502 is completed, in response thereto, the secure portion 300 of the data processing device 800 may sign the data element 500 with its private key 321 to thereby generate a signed data element 600.

As described in the above example, this signed data element 600 is signed with a private key 321 of the Bitcoin network (depicted by a 7-sided star), and can be verified by the respective public key 301, which may also be extracted from the data processing device 800.

In embodiments, the key pair 301, 321 may be generated in the secure portion 300 of the data processing device 800. For example, the secure element 300 may have a random source of entropy to generate a seed, which may also be referred to as a pseudo random seed. Based on this seed, which may also be referred to as the private master key, a plurality of key pairs 301, 321 ( . . . ), 30S, 32S can be derived by a key derivation function. A key derivation parameter may then be additionally supplied to the secure portion 300 of the data processing device 800 to generate a particular set of keys.

The secure portion 300 may comprise computational processing means. For example, the secure portion 300 of the data processing device 800 may comprise a tamperproof secure microcontroller, such as, a NXP SmartMX secure microcontroller family, e.g., the NXP SmartMX3 P71D321. The use of secure microcontrollers may be particularly advantageous for increasing the security of transactions (i.e., data communications) between the secure portion 300 and an external device (for e.g., when sending out the signed data element 600 or the public key 301) or an unsecure portion of the data processing device 800 (for e.g., when receiving the signed elements 501 or 502). A secure microcontroller may facilitate hiding the private key 321 even in case of malware presence. Further, the secure microcontroller may be configured to mitigate side channel attack to discover the private key 321, may be sandboxed from the rest of the data processing device 800, and may be brute force resistant (e.g., self-destroys after a limited number of failed verifications).

Preferably, the secure portion 300 may provide hardware and software protection for maintaining the secrecy of the private key 321 (and any other data that may be stored in the secure portion 300). The secure portion 300 may comprise one or more secure microcontrollers and one or more secure memory components. Further, the data processing device 800 may comprise further components external to the secure portion 300. These can for example be, a general processor, general microcontroller, general memory devices and I/O interfaces. Said components may facilitate receiving and sending data to/from an external device or storing data such as the public keys 101, 102, ( . . . ) 10M.

It will be appreciated that the technology described above allows inter blockchain operability. More particularly, the users can use their key pairs of a first blockchain network (e.g., the Ethereum network in the above example) to authorize transactions in a second blockchain network (in the above example, in the Bitcoin network). By requiring at least N of M signatures to verify a transaction, it may help decentralize the method of digitally signing inter blockchain transactions. Further, by keeping the private (master) key 321 in a secure portion that may never be accessed by an external device, it may allow the method to also be trustless.

In the embodiment 10 described above, it will be understood that only the data processing device 800, and more particularly the secure portion 300 thereof, comprises the private key 321, which may thus never be visible.

Thus, when only the above discussed data processing device 800 is provided, and the private key 321 is required, this requires the use of the discussed data processing device 800. However, in case the data processing device 800 is lost or damaged, in the embodiment described above, there is no means of performing such a functionality. This may have severe consequences, e.g., in case the private key 321 is necessary to access, e.g., a Bitcoin account.

To overcome such problems, embodiments of the present technology also relate to "cloning" the data processing device 800 and more particularly the secure portion 300 thereof.

In such embodiments, the secure portion 300 of the data processing device 800 comprises the M public keys 101, 102 ( . . . ), 10M, the rule 200 relating to the N of M accessing scheme, and the private key 321 with or without its public key 301, or alternatively a seed, the so-called pseudo random seed or private master key.

This information may be cloned to another data processing device 800*b*, which will be referred to as a backup device. More particularly, it may be cloned to a secure portion 300*b* of the backup device 800*b*. In this regard, it is noted that the information may only be transferred to the secure portion of the backup device 800*b*, without being visible in the open.

More particularly, an information exchange protocol, such as the Diffie-Hellmann exchange protocol, more particularly the Elliptic Curve Diffie-Hellmann exchange protocol may be used to clone the information from the secure portion 300 in the data processing device 800 to the secure portion 300*b* in the backup device 800*b*.

The information exchange protocol may only allow all data described above, i.e., the M public keys 101, ( . . . ), 10M, the rule 200 relating to the N of M accessing scheme, and the seed to be exchanged together, but may prohibit that only a part of the data is exchanged (without the other data).

If, for example, the protocol would allow that only the seed and the public keys 101, ( . . . ), 10M be transferred (without requiring transfer of the rule 200 relating to the N of M accessing scheme), another accessing scheme could be implemented on the backup device 800*b*. For example, in such a scenario, a 1 of M accessing scheme could be implemented, which would allow a single user to enable the functionalities of the backup device 800*b*, which would be detrimental to safety.

Both the original data processing device 800 and the backup device 800*b* may be originally implemented with a shared secret (which may also be referred to as shared encryption secret, shared signature secret or factory shared secret). This may prevent an emulated card to simulate the backup device 800*b*, and it may thus be prevented that an emulated card can extract information (e.g., the seed or a hidden key) from the secure portion 300 of the data processing device 800.

To validate the data exchange protocol, the original data processing device 800 and the backup device 800*b* may exchange a signature of each other's content (or a hash thereof), and the exactitude of the exchanged information may then be validated. In particular, the backup device 800*b* may be implemented to only enable its functionality if the exactitude of information compared to the original data processing device 800 has been validated.

Thus, the backup device 800*b* may be an exact clone of the data processing device 800, such that also the backup device 800*b* can be used, e.g., in case the data processing device 800 is lost or damaged.

Typically, when sending a data element 500 to be signed to the data processing device 800 (or to the backup device), a key derivation parameter may also be sent together with the data element 500. For example, the key derivation parameter may be "use the third key pair generated by the seed". Thus, by having the identical information stored in the secure portion 300*b* (and by means of the key derivation parameter), the original data processing device 800 and the backup device 800*b* would return the same signature if provided with the same request.

In the above, particular embodiments of the present technology have been described with reference to FIGS. 1 to 4. However, it should be understood that these embodiments were merely exemplary and should not limit the scope of the present invention. For example, while in the above, an authorization protocol employing an N of M scheme and using M public keys was described, this authorization protocol was a mere example and also other authorization protocols can be used, as will be discussed below in conjunction with FIGS. 4 and 5.

Figure 5:
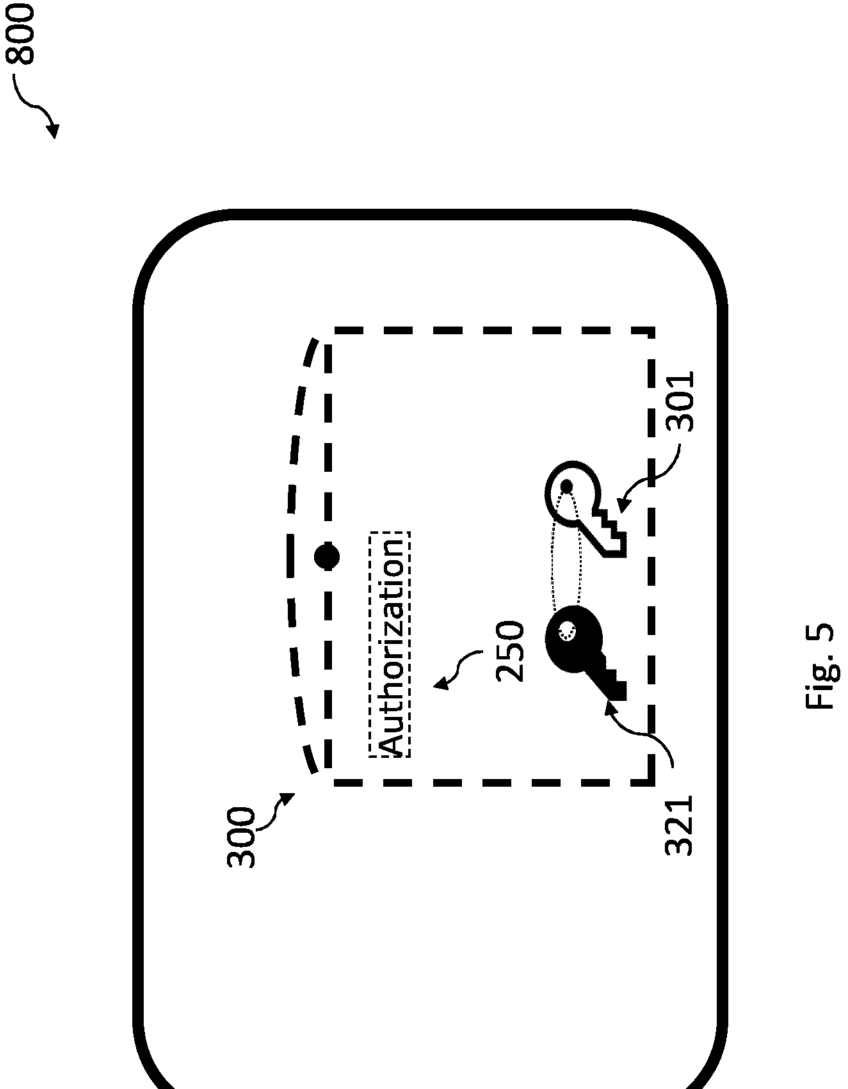
FIG. 5 depicts a data processing device according to another embodiment of the present technology.

FIG. 5 depicts another exemplary data processing device 800 according to embodiments of the present technology. Again, the data processing device 800 may be a card. The data processing device 800 comprises a secure portion 300.

Similar to the data processing device 800 discussed above, the data processing device 800 comprises a pair of a private data processing device key 321 and a public data processing device key 301 in the secure portion 300. Furthermore, the secure portion 300 also comprises an authorization protocol 250. The authorization protocol 250 stores data and/or instructions relating to authorizing a functionality of the secure portion 300 and in particular a signing functionality in the secure portion 300.

In the embodiments discussed before, the authorization protocol 250 included the N of M scheme 200 and the private keys 101 to 10M.

However, the authorization protocol 250 may also be realized differently. For example, in the embodiment depicted in FIG. 5, the authorization protocol 250 may include a device identification code (which may also be referred to as a device PIN). For example, the device identification code may be an alphanumerical string.

Figure 6:
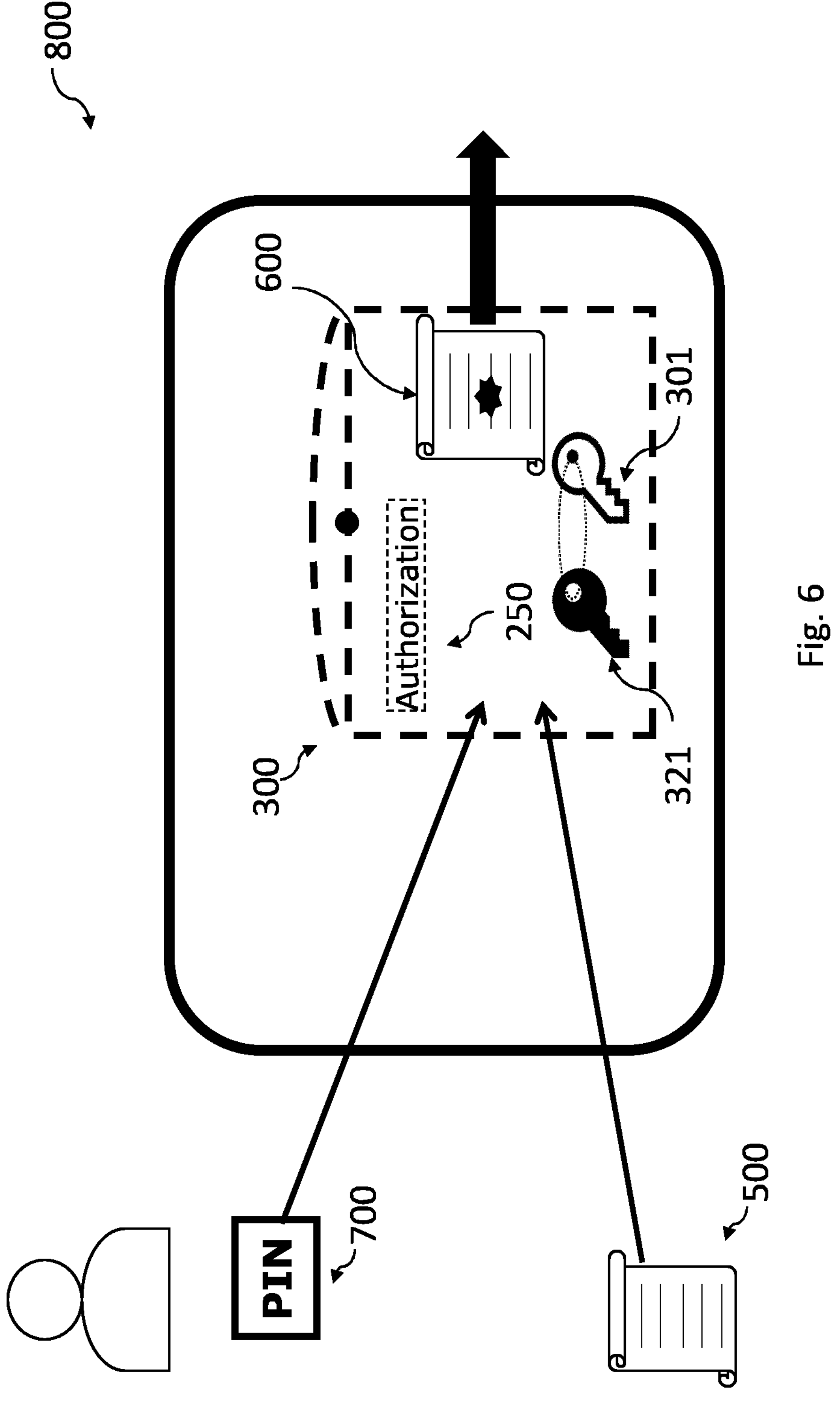
FIG. 6 depicts the data processing device of FIG. 5 digitally signing a data element using the private data processing device key upon successful completion of an authorization protocol.

With regard to FIG. 6, similar to the embodiments discussed above, a data element 500 may again be provided to the data processing device 10 and more particularly to the secure portion 300 thereof. However, in the embodiments of FIGS. 5 and 6, a signing of the data element 500 may be triggered by a user entering an identification code 700 (e.g., a PIN).

Once this identification code 700 has been entered, assessed in the secure portion 300. More particularly, it is compared to the device identification code. If the two match, this indicates a successful authorization, i.e., a successful completion of the authorization protocol.

In response thereto, the data element 500 is signed by means of the private key 321, and thus a signed data element 600 is generated, which can then be output.

Figure 7:
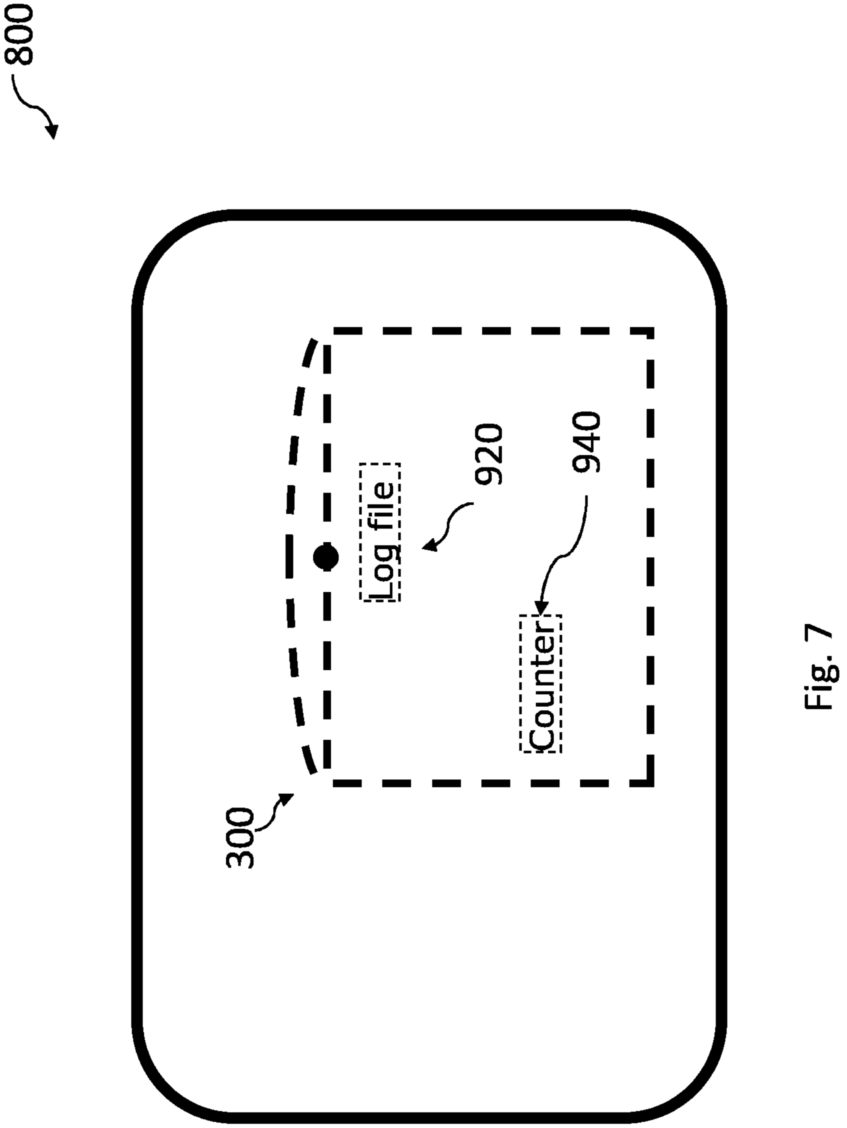
FIG. 7 depicts the data processing device further comprising a log file of digital signings and a counter.

Furthermore, additional functionalities may be realized in the data processing device 800, and more particularly in the secure portion 300 thereof, as depicted in FIG. 7. It should be understood that the functionality discussed in conjunction with FIG. 7 is independent on the exact realization of the authorization protocol 250. For example, it may be used with an authorization protocol using an N of M scheme 200 and M public keys 101 to 10M as discussed above in conjunction with FIGS. 1 to 4, but also in conjunction with the authorization protocol 250 based on a device identification code as discussed in conjunction with FIGS. 5 and 6.

According to one potential additional functionality, a log file 920 for digital signatures is provided. The log file 920 may also be referred to as signature database or register. In the register, whenever a digital signature is performed by the device, details of this digital signature (e.g., the signed hashes) are stored, i.e., registered in the log file 920.

Additionally, or alternatively, the secure portion 300 may comprise a counter 940. This counter may be changed (and more particularly increased by 1) whenever a digital signature is performed by means of the data processing device 800. The log file may additionally record the number on the counter with details of each digital signature recorded.

That is, in embodiments of the present technology, transaction logging and counters can be used. That is, the following functionality can be added to the data processing device 800 (e.g., the card): the data processing device can, e.g., register all the last 100 signed hashes. This opens up the possibility to verify the use of the card in the future.

Thus, it can be verified if and how the data processing device 800 was used. In particular, unintended use or hacking can also be documented, thereby increasing the security of the data processing device 800. More particularly, proof can be established that the card was not used for a specific transaction.

Furthermore, also a signature counter 940 can be implemented. This may be a simple way of storing and documented if and how often the data processing device 800 has been used.

For example, the transaction logging mechanism and/or counter mechanism of signed transactions to prove the past use of the hidden key, may also be applied in case of providing an insurance contract by an insurance company in case of the unlikely use of the "ever hidden" key by, e.g., side channel attack on the chip. For the insurance to cover a damage, the chip would have to be provided to be able to check the past transactions. By means of the transaction logger 920 and/or counter 940, it can thus be proven that the chip was not used to sign, such that an insurance may cover a potential damage.

Such functionalities may be of particular interest for non fungible tokens ("NFT"). For example, consider that a data processing device 800 and a corresponding backup device have been generated, and both of them have the respective data processing device private key 321 stored in their secure portion 300, wherein this data processing device private key 321 can be used to sign a data element to indicate (or transfer) ownership of an NFT.

In such a case, if both the data processing device and the backup device have a signature counter equaling 0, one can be confident that the NFT is still linked to the data processing device and no transaction of it has been performed by means of the data processing device. Without such a counter and register, it would be possible to receive the data processing device and the backup device, but a malicious agent may have used one of the data processing devices before transfer of ownership of the devices to generate a signed data element (indicative of a transaction of the NFT), and then publish this data element (i.e., finalize the transaction) later, such that the NFT would no longer be linked to the data processing device and the backup device. This is not possible if a register 920 and/or a counter 940 is provided in the secure portion 300 of the data processing device 800, such that these embodiments add to the security of the data processing device 800.

As described above for one embodiment of the data processing device 800 depicted in FIG. 1, a backup device 800*b* may also be provided for the data processing device 800 according to the embodiments depicted in FIGS. 5 to 7.

More particularly, the backup device 800*b* may be a clone of the data processing device 800 according to any of the embodiments described above. For example, in the embodiment depicted in FIG. 5, where the data processing device 800 comprises a secure portion 300 and an authorization protocol 250 and a pair of a public data processing device key 301 and private data processing device key 321 in the secure portion 300, the backup device 800*b* may also comprise a backup secure portion 300*b* and a backup authorization protocol 250*b* and a pair of public data processing device key 301*b* and private data processing device key 321*b* in the backup secure portion 300*b*.

Additionally, the backup device 300*b* may comprises features of the embodiment depicted in FIG. 7, where the backup device 300*b* may comprise a backup secure portion 300*b* with an authorization protocol 250*b* according to any of the embodiments depicted in FIG. 1 or FIG. 5, and a backup log file 920*b* and a backup counter 940*b* may be further provided in the backup secure portion 300*b*.

The backup device 800*b* may be generated from the data processing device 800 by using a secure information exchange protocol, such that no information is visible in the open. For example, information may be exchanged using a protocol such as the Diffie-Hellmann exchange protocol, or more particularly the Elliptic Curve Diffie-Hellmann exchange protocol.

The information exchange protocol may further only allow all of the data comprised by the data processing device 800, for example the authorization protocol 250 and the pair of private and public data processing device keys 301, 321 to be exchanged, but may prohibit exchange of only a part of the data (without the other data).

In the above, it has already been described that embodiments of the present technology can be used to verify whether the data processing device 800 has already been used to sign a transaction. This will further be described with reference to FIGS. 8 and 9.

FIG. 8 again depicts the data processing device 800, e.g., smart card, and it will be understood that like reference numerals in this Figure denote like features as discussed with reference to the other figures.

As discussed, the data processing device 800 comprises a secure portion 300, and the secure portion 300 comprises a public data processing device key 301 and a private data processing device key 321. The secure portion 300 may further comprise an authorization protocol 250 as discussed, as well as a log file 920 and a counter 940.

Furthermore, the secure portion 300 also comprises a clone or backup indication 960. This clone indication 960 indicates whether another data processing device with corresponding functionality was generated. For example, it indicates whether a backup device of the data processing device 800 has been generated, i.e., whether the data processing device 800 has been "cloned".

It will be understood that in case a backup device of a data processing device 800 has been generated, the clone indicator will be positive for both the data processing device 800 and the backup data processing device. Furthermore, the clone indicator may also indicate the relation of the respective device with its clone. That is, in the above described case, the clone indicator for the data processing device 800 may indicate that a clone of the data processing device 800 was generated, i.e., that the data processing device is the "parent" in this relationship, and the clone indicator of the backup data processing device may indicate that it is the "child" in this relationship.

Further still, the data processing device 800 may also comprise a factory certificate 980, i.e., a certificate provided to the card 800 at its generation and/or initialization.

As an example for the functionality, it will be understood that the data processing device 800 and particularly the private data processing device key 321 may, e.g., indicate ownership of an NFT. Further, the data processing device 800 can also be used to transfer ownership of the NFT, when signing a respective transaction by means of the private data processing device key 321.

Thus, it may be of interest to be able to determine whether the data processing device 321 has already been used, or whether it has not yet been used to sign a respective transaction. In case it is determined that it has not been used, this indicates that the NFT is still linked to the data processing device 321.

For example, the counter 940 may be used for this determination. In particular, it should be understood that the counter 940 may be signature type specific. That is, the counter 940 may only increase by 1 in case of specific signatures of the private data processing device key 321, but may not increase in case of other signatures. For example, consider that a certain blockchain requires transactions to be of a certain size, e.g., 42 byte. The counter may then increase if a data element of this size is signed, but not in case a data element of a smaller size, e.g., 8, 10, or 12 byte is signed.

Figure 8:
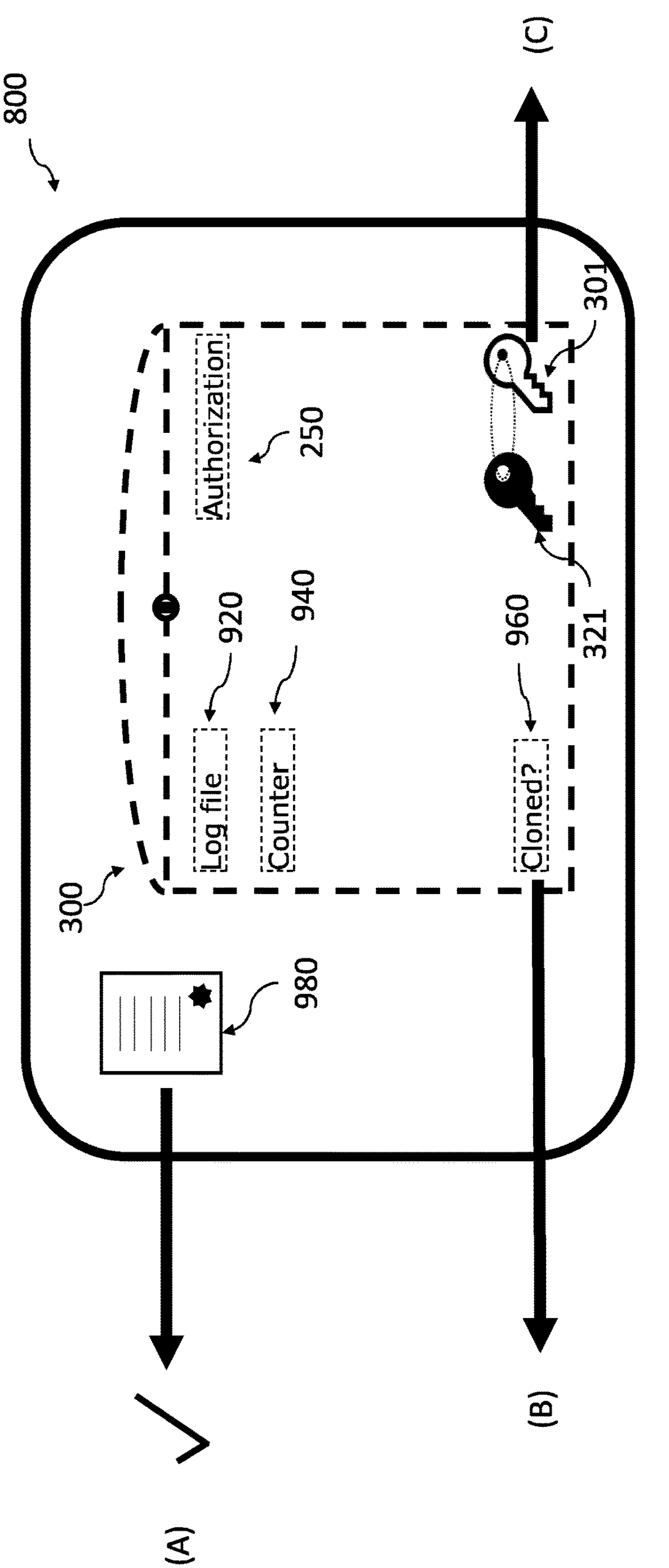
FIGS. 8 and 9 depict a method to test whether a data processing device has already been used to sign a data element.
Figure 9:
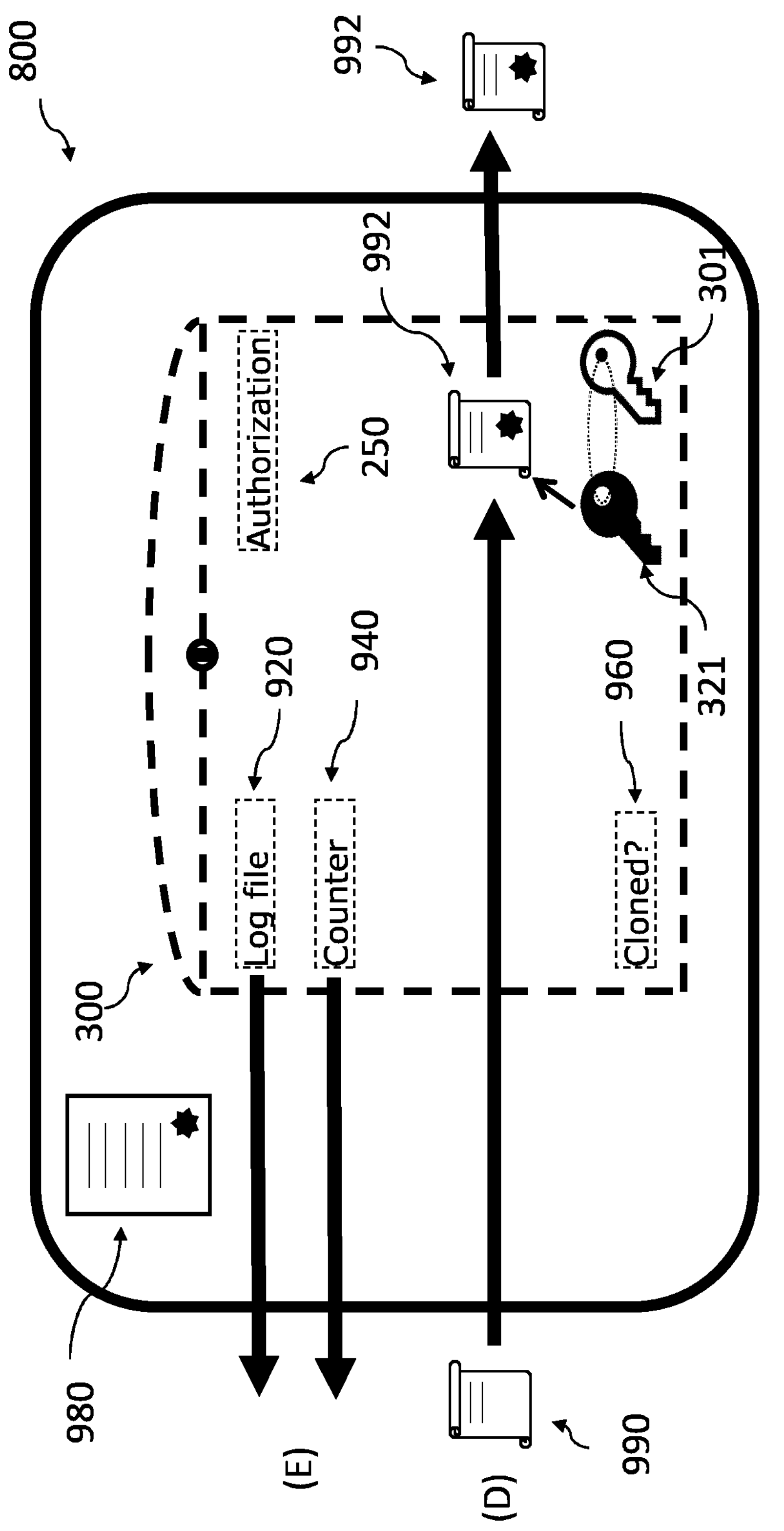

A verification of the data processing device 800 may comprise different steps, as depicted in FIGS. 8 and 9. According to a step (A), the factory certificate 980 may be output and it may be checked whether the certificate 980 is authentic, i.e., signed with a correct key.

Furthermore, according to step (B), the clone indication 960 may be output, i.e., it may be determined whether the data processing device 800 is a single data processing device 800 or whether a backup of this device exists.

According to step (C), the public data processing device key 321 may be output.

With reference to FIG. 9, in a step (D), it may be determined whether the private data processing device key 321 is functional, i.e., whether it can sign a test data element 990. More particularly, the test data element 990 can be provided to the secure portion 300 and it can be signed here by means of the private data processing device key 321 to generate a signed test data element 992, which can then be output. In the above, it has been described that the counter 940 may be signature type specific. This is particularly used in step (D). In this regard, it is noted that the test data element 990 is of such a type (e.g., size) that the signature in step (D) will not lead to an increase of the counter 940. Overall, step (D) thus allows checking the functionality of the private data processing device key 321 without this leading to an increase in the counter 940.

In a step (E), the log file 920 and/or the counter 940 are read out, and it is thus checked whether the data processing device 800 has been used for a signature. For example, in case the counter is at 0 and/or the log file indicates that no signature has been performed, this indicates that the data processing device 800 has not been used for a signature. If, conversely, the counter is not at 0 (e.g., at 1) and/or there is a signature stored in the log file, this indicates that the data processing device 800 has been used for a signature.

In a further step (F) (not depicted), it may be checked by means of the public data processing device key 301 output in step (C) whether a digital asset belongs to the public data processing device key 301. If this step is successful, this indicates that the corresponding private data processing device key 321 can in fact be used to sign a transaction to shift ownership of the NFT.

In the above, it has in particular been described that in step (B), the clone indication 960 is output.

If this output indicates that data processing device 800 has not been cloned, i.e., that the data processing device 800 is a single data processing device without a clone, the above described method may be complete.

However, in case this output indicates that the data processing device 800 has been cloned, at least some of the steps (A) to (E) may also be performed for the clone, i.e., for the backup data processing device corresponding to the data processing device 800.

In particular, the step (E) may also be performed for the backup data processing device, which will also just be referred to as backup in the below for sake of simplicity. That is, also for the backup, the log file 920 and/or counter 940 may be read out. In case the log file 920 is empty and/or the counter 940 of the backup is 0 (and this also applies to the data processing device 800), this indicates that neither the data processing device 800 nor the backup have been used for a signature, e.g., to transfer ownership of an NFT.

Furthermore, also any one of steps (A), (B), (C), and/or (D), i.e., any one of the step relating to outputting and checking the authenticity of the certificate (step A), the step of checking the clone status (B), the step of checking outputting the public key (C) and/or the check of the functionality of the private key by means of a test data element (D) may be performed for the backup data processing device.

Furthermore, for the backup data processing device, the step (F) may be omitted. Instead, the public data processing device key output by the backup data processing device may be compared to the public data processing device key output by the data processing device 800.

Overall, the method described with reference to FIGS. 8 and 9 thus provide an approach to determine whether the data processing device 800 has been used for particular signatures, and thus to indicate whether a transaction of a data element of interest associated therewith (e.g., a block in a blockchain indicating ownership of an NFT) has been performed.

If this test is negative, this indicates that the data processing device 800 (together with the backup data processing device in case of a cloned data processing device 800) indicates ownership of the NFT.

While in the above, it has been described that embodiments of the present technology can be used to verify that a data processing device 800 (and optionally its backup) have not been used to sign a transaction relating to a data block indicating ownership of an NFT, the skilled person will understand that this is only exemplary and that the embodiments of the present invention are not limited to NFTs.

Instead, embodiments of the present technology can also be used to fungible tokens, e.g., for prepaid card applications.

Again, also in such a scenario, the method described with reference to FIGS. 8 and 9 may be used to verify that the data processing device 800 (and optionally its clone) have not been used for signatures, to thus verify that the data processing device 800 (and optionally its backup) is/are still associated with the ownership of the respective data blocks.

Whenever steps were recited in the above or also in the appended claims, it should be noted that the order in which the steps are recited in this text may be accidental. That is, unless otherwise specified or unless clear to the skilled person, the order in which steps are recited may be accidental. That is, when the present document states, e.g., that a method comprises steps (A) and (B), this does not necessarily mean that step (A) precedes step (B), but it is also possible that step (A) is performed (at least partly) simultaneously with step (B) or that step (B) precedes step (A). Furthermore, when a step (X) is said to precede another step (Z), this does not imply that there is no step between steps (X) and (Z). That is, step (X) preceding step (Z) encompasses the situation that step (X) is performed directly before step (Z), but also the situation that (X) is performed before one or more steps (Y1), . . . , followed by step (Z). Corresponding considerations apply when terms like "after" or "before" are used.

While in the above, preferred embodiments have been described with reference to the accompanying drawings, the skilled person will understand that these embodiments were provided for illustrative purpose only and should by no means be construed to limit the scope of the present invention, which is defined by the claims.

The invention claimed is:

1. A data processing device for performing a digital signature, wherein the data processing device comprises:
- a secure portion, wherein the secure portion comprises:
  - a private data processing device key, and/or
  - a seed configured to generate at least one pair of the private data processing device key and a public data processing device key;
- wherein the secure portion further comprises M public keys, wherein M is a natural number greater than 1;
- an N of M scheme, wherein N is a natural number not exceeding M; and
- an authorization protocol;
- wherein the data processing device is configured to:
  - digitally sign a data element with the private data processing device key in the secure portion in response to a successful completion of the authorization protocol, wherein the authorization protocol comprises:
    - receiving the data element;
    - receiving at least N versions of the data element, wherein each of the N versions is signed by a distinct private key corresponding to one of the M public keys; and
    - in response to receiving the at least N versions of the data element, verifying the at least N versions of the data element by using at least N of the M public keys; and
  - send the data element digitally signed with the private data processing device key.

2. The data processing device according to claim 1, wherein the secure portion comprises the N of M scheme.

3. The data processing device according to claim 1, wherein the secure portion comprises the seed, and wherein the data processing device is configured to receive a key derivation parameter and wherein the secure portion is configured to generate the pair of the private data processing device key and the public data processing device key based on the key derivation parameter.

4. The data processing device according to claim 3, wherein the data processing device is configured to send the public data processing device key.

5. The data processing device according to claim 1, wherein:
- the secure portion comprises the authorization protocol;
- the data processing device comprises a device identification code; and
- the successful completion of the authorization protocol comprises receiving an identification code and comparing the identification code to the device identification code.

6. The data processing device according to claim 1, wherein the data processing device is further configured to, when digitally signing the data element, register the digital signing, and wherein the data processing device comprises a log file configured to register the digital signing.

7. The data processing device according to claim 1, wherein the data processing device is configured to change a counter when digitally signing the data element, wherein the counter is signature type specific.

8. The data processing device according to claim 1, wherein the data processing device is a card.

9. The data processing device according to claim 1, wherein the data processing device comprises a clone indicator, wherein the clone indicator indicates whether another data processing device with corresponding functionality was generated.

10. A method of initializing a data processing device, wherein the method comprises:
- providing the data processing device, wherein the data processing device comprises a secure portion, wherein the secure portion comprises:
  - a private data processing device key, and/or
  - a seed configured to generate at least one pair of the private data processing device key and a public data processing device key;
- providing an authorization protocol to the data processing device;
- providing M public keys to the secure portion of the data processing device, wherein M is a natural number greater than 1;
- providing an N of M scheme to the data processing device, wherein N is a natural number not exceeding M;
- configuring the data processing device to digitally sign a data element with a private data processing device key in the secure portion in response to a successful completion of the authorization protocol, wherein the successful completion of the authorization protocol comprises:
  - receiving the data element;
  - receiving at least N versions of the data element, wherein each of the N versions is signed by a distinct private key corresponding to one of the M public keys; and
  - verifying, in response to receiving the at least N versions of the data element, the at least N versions of the data element by using at least N of the M public keys; and
- sending the data element digitally signed with the private data processing device key.

11. A system comprising:
- a data processing device comprising:
  - a secure portion, wherein the secure portion comprises:
    - a private data processing device key, and/or
    - a seed configured to generate at least one pair of the private data processing device key and a public data processing device key;

wherein the secure portion further comprises M public keys, wherein M is a natural number greater than 1;

an N of M scheme, wherein N is a natural number not exceeding M; and an authorization protocol;

wherein the data processing device is configured to:

digitally sign a data element with the private data processing device key in the secure portion in response to a successful completion of the authorization protocol, wherein the authorization protocol comprises:

receiving the data element;

receiving at least N versions of the data element, wherein each of the N versions is signed by a distinct private key corresponding to one of the M public keys; and in response to receiving the at least N versions of the data element, verifying the at least N versions of the data element by using at least N of the M public keys; and send the data element digitally signed with the private data processing device key; and a backup device comprising a backup secure portion, wherein the backup secure portion comprises:

the private data processing device key and/or the seed; and the authorization protocol;

wherein the backup device is configured to digitally sign the data element with the private data processing device key in the backup secure portion in response to the successful completion of the authorization protocol.

12. The system according to claim 11, wherein the private data processing device key and/or the seed, and the authorization protocol are provided to the backup secure portion by a cryptographic information exchange protocol.

13. A method of generating a backup device, wherein the method comprises:

providing a data processing device, wherein the data processing device comprises:

a secure portion, wherein the secure portion comprises:

a private data processing device key, and/or a seed configured to generate at least one pair of the private data processing device key and a public data processing device key;

wherein the secure portion further comprises M public keys, wherein M is a natural number greater than 1;

an N of M scheme, wherein N is a natural number not exceeding M; and an authorization protocol;

wherein the data processing device is configured to:

digitally sign a data element with a private data processing device key in the secure portion in response to a successful completion of the authorization protocol, wherein the authorization protocol comprises:

receiving the data element;

receiving at least N versions of the data element, wherein each of the N versions is signed by a distinct private key corresponding to one of the M public keys; and in response to receiving the at least N versions of the data element, verifying the at least N versions of the data element by using at least N of the M public keys; and send the data element digitally signed with the private data processing device key;

providing a second data processing device comprising a backup secure portion;

providing the private data processing device key and/or the seed, the M public keys, the N of M scheme, and the authorization protocol, to the second data processing device and thereby generating the backup device; and configuring the backup device to digitally sign the data element with the private data processing device key in the backup secure portion in response to the successful completion of the authorization protocol.

14. A method for testing a prior use of a data processing device comprising:

a secure portion, wherein the secure portion comprises:

a private data processing device key, and/or a seed configured to generate at least one pair of the private data processing device key and a public data processing device key;

wherein the secure portion further comprises M public keys, wherein M is a natural number greater than 1;

an N of M scheme, wherein N is a natural number not exceeding M; and an authorization protocol;

wherein the data processing device is configured to:

digitally sign a data element with a private data processing device key in the secure portion in response to a successful completion of the authorization protocol, wherein the authorization protocol comprises:

receiving the data element;

receiving at least N versions of the data element, wherein each of the N versions is signed by a distinct private key corresponding to one of the M public keys; and in response to receiving the at least N versions of the data element, verifying the at least N versions of the data element by using at least N of the M public keys;

send the data element digitally signed with the private data processing device key; and when digitally signing the data element:

register the digital signing, and wherein the data processing device comprises a log file configured to register the digital signing; and/or change a counter, wherein the counter is signature type specific;

wherein the method comprises:

the data processing device outputting data of the counter and/or outputting data of the log file; and verifying whether there was the prior use of the data processing device by means of the data of the counter and/or the data of the log file.

15. The method according to claim 14, wherein:

the data processing device comprises a clone indicator, wherein the clone indicator indicates whether another data processing device with corresponding functionality was generated; and the method further comprises:

the data processing device outputting data of the clone indicator; and assessing, by means of the data of the clone indicator, whether another data processing device with corresponding functionality was generated.

16. The method according to claim 14, wherein the method further comprises:

the data processing device receiving a test data element;

the data processing device signing the test data element with the data processing device private key and thus generating a signed test data element; and the data processing device outputting the signed test data element;

wherein the data processing device signing the test data element does not lead to a change of the counter.

17. The method according to claim 14, wherein:

a backup data processing device is configured to change a backup counter when digitally signing the data element; and/or wherein the backup device is further configured to, when digitally signing the data element, register the digital signing, wherein the backup data processing device comprises a backup log file configured to register the digital signing;

assessing whether another data processing device with corresponding functionality was generated yields a positive result; and the method further comprises:

the backup data processing device outputting data of the backup counter and/or outputting data of the backup log file; and verifying whether there was a prior use of the backup data processing device by means of the data of the backup counter and/or the data of the backup log file.

* * * * *